(12) United States Patent
Higa et al.

(10) Patent No.: US 12,141,856 B2
(45) Date of Patent: *Nov. 12, 2024

(54) SELF-CHECKOUT SYSTEM, PURCHASED PRODUCT MANAGEMENT METHOD, AND PURCHASED PRODUCT MANAGEMENT PROGRAM

(71) Applicant: NEC Corporation, Tokyo (JP)

(72) Inventors: Kyota Higa, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,534

(22) Filed: Aug. 22, 2023

(65) Prior Publication Data
US 2023/0394557 A1 Dec. 7, 2023

Related U.S. Application Data

(63) Continuation of application No. 16/971,718, filed as application No. PCT/JP2018/009204 on Mar. 9, 2018, now Pat. No. 11,922,482.

(51) Int. Cl.
*G06Q 30/00* (2023.01)
*G06Q 10/087* (2023.01)
(Continued)

(52) U.S. Cl.
CPC ....... *G06Q 30/0633* (2013.01); *G06Q 10/087* (2013.01); *G06Q 20/18* (2013.01); *G06T 7/0008* (2013.01); *G06T 7/74* (2017.01); *G06V 20/52* (2022.01); *G06T 2207/10024* (2013.01); *G06T 2207/30232* (2013.01)

(58) Field of Classification Search
CPC ................................ G06Q 30/06–08
See application file for complete search history.

(56) References Cited

U.S. PATENT DOCUMENTS 9,911,290 B1  3/2018 Zalewski ........... G06Q 30/0633
11,922,482 B2 *  3/2024 Higa ...................... G06V 20/52
(Continued)

FOREIGN PATENT DOCUMENTS

JP  2000-123086 A  4/2000
JP  2015-176227 A  10/2015
(Continued)

OTHER PUBLICATIONS

Zoran Zivkovic, "Improved Adaptive Gaussian Mixture Model for Background Subtraction", Proceedings of the 17th International Conference on Pattern Recognition (ICPR'04), IEEE Computer Society, Aug. 2004, pp. 28-31, vol. 2-vol. 02, USA.

(Continued)

*Primary Examiner* — Ethan D Civan
(74) *Attorney, Agent, or Firm* — Sughrue Mion, PLLC

(57) ABSTRACT

A change detection means 840 detects an area of change in a product shelf on which a product has been arranged, on the basis of a captured image of the product. A classification means 850 classifies the change in the product shelf in the detected area of change. A shopping list generation means 860 generates a shopping list for a customer on the basis of the classification of the change in the product shelf and of shelving information on the product shelf.

10 Claims, 22 Drawing Sheets

(51) Int. Cl.
   *G06Q 20/18*     (2012.01)
   *G06Q 30/0601*   (2023.01)
   *G06T 7/00*      (2017.01)
   *G06T 7/73*      (2017.01)
   *G06V 20/52*     (2022.01)

(56) References Cited

U.S. PATENT DOCUMENTS

| | | |
|---|---|---|
| 2012/0314915 A1 | 12/2012 | Ochi et al. |
| 2013/0051667 A1 | 2/2013 | Deng et al. |
| 2015/0052029 A1 | 2/2015 | Wu .................. G06Q 10/087 |
| | | 705/28 |
| 2016/0210829 A1 | 7/2016 | Uchida et al. |

FOREIGN PATENT DOCUMENTS

| | | |
|---|---|---|
| JP | 2016-201105 A | 12/2016 |
| JP | 2016-218821 A | 12/2016 |
| JP | 2017-204095 A | 11/2017 |
| WO | 2015/033576 A1 | 3/2015 |
| WO | 2015/033577 A1 | 3/2015 |
| WO | 2015/079622 A1 | 6/2015 |
| WO | 2015/140853 A1 | 9/2015 |
| WO | 2017/150590 A1 | 9/2017 |

OTHER PUBLICATIONS

International Search Report for PCT/JP2018/009204 dated May 29, 2018 (PCT/ISA/210).
Coldewey, D., "Inside Amazon's Surveillance-Powered No-Checkout Convenience Store" Techcrunch.com, Jan. 21, 2018 (https://techcrunch.com/2018/01/21/inside-amazons-surveillance-powered-no-checkout-convenience-store/) (Year: 2018).
US Office Action for U.S. Appl. No. 18/236,543, mailed on Apr. 9, 2024.
JP Office Action for JP Application No. 2023-120618, mailed on Jul. 2, 2024 with English Translation.

* cited by examiner

FIG. 6

| SECOND ATTENTION IMAGE | FIRST ATTENTION IMAGE | TYPE OF CHANGE |
|---|---|---|
| (91) | (92) | CHANGE CAUSED BY PRODUCT CONTAINED ANEW IN PRODUCT SHELF |
| | | CHANGE CAUSED BY PRODUCT HAVING BEEN TAKEN |
| | | CHANGE CAUSED BY DIFFERENT APPEARANCE OF PRODUCT DISPLAYED ON PRODUCT SHELF |

FIG. 7

| PERSON ID | CAMERA ID | POSITION INFORMATION (x,y,width,height) | TYPE OF CHANGE |
|---|---|---|---|
| 1 | 1 | 10,0,30,50 | PRODUCT DECREASE |
| 2 | 1 | 500,250,30,50 | PRODUCT DECREASE |
| 3 | 1 | 500,250,30,50 | PRODUCT INCREASE |
| 4 | 1 | 250,300,30,50 | PRODUCT INCREASE |
| 5 | 1 | 750,100,40,50 | PRODUCT INCREASE |

| PERSON ID | CAMERA ID | POSITION INFORMATION (x,y,width,height) | TYPE OF CHANGE |
|---|---|---|---|
| 1 | 1 | 10,0,30,50 | PRODUCT DECREASE |
| | 1 | 250,300,30,50 | PRODUCT INCREASE |
| 2 | 1 | 500,250,30,50 | PRODUCT DECREASE |
| | 1 | 500,250,30,50 | PRODUCT INCREASE |
| 5 | 1 | 750,100,40,50 | PRODUCT INCREASE |

FIG. 18

| PERSON ID | PRODUCT SHELF ID | CAMERA ID |
|---|---|---|
| 1 | PRODUCT SHELF A | 1 |
| 2 | PRODUCT SHELF A | 1 |
| 2 | PRODUCT SHELF A | 1 |
| 1 | PRODUCT SHELF A | 1 |
| 3 | PRODUCT SHELF A | 1 |

FIG. 19

| PERSON ID | CAMERA ID | PRODUCT SHELF ID | POSITION INFORMATION (x,y,width,height) | TYPE OF CHANGE |
|---|---|---|---|---|
| 1 | 1 | PRODUCT SHELF A | 10,0,30,50 | PRODUCT DECREASE |
| 2 | 1 | PRODUCT SHELF A | 500,250,30,50 | PRODUCT DECREASE |
| 2 | 1 | PRODUCT SHELF A | 500,250,30,50 | PRODUCT INCREASE |
| 1 | 1 | PRODUCT SHELF A | 250,300,30,50 | PRODUCT INCREASE |
| 3 | 1 | PRODUCT SHELF A | 750,100,40,50 | PRODUCT INCREASE |

FIG. 20

| PERSON ID | CAMERA ID | PRODUCT SHELF ID | POSITION INFORMATION (x,y,width,height) | TYPE OF CHANGE |
|---|---|---|---|---|
| 1 | 1 | PRODUCT SHELF A | 10,0,30,50 | PRODUCT DECREASE |
| 1 | 1 | PRODUCT SHELF A | 250,300,30,50 | PRODUCT INCREASE |
| 2 | 1 | PRODUCT SHELF A | 500,250,30,50 | PRODUCT DECREASE |
| 2 | 1 | PRODUCT SHELF A | 500,250,30,50 | PRODUCT INCREASE |
| 3 | 1 | PRODUCT SHELF A | 750,100,40,50 | PRODUCT INCREASE |

| TERMINAL IDENTIFICATION INFORMATION | PRODUCT SHELF ID | POSITION INFORMATION (x,y,width,height) | TYPE OF CHANGE |
|---|---|---|---|
| 1 | PRODUCT SHELF A | 10,0,30,50 | PRODUCT DECREASE |
| 1 | PRODUCT SHELF A | 250,300,30,50 | PRODUCT INCREASE |
| 2 | PRODUCT SHELF A | 500,250,30,50 | PRODUCT DECREASE |
| 2 | PRODUCT SHELF A | 500,250,30,50 | PRODUCT INCREASE |
| 3 | PRODUCT SHELF A | 750,100,40,50 | PRODUCT INCREASE |

SELF-CHECKOUT SYSTEM, PURCHASED PRODUCT MANAGEMENT METHOD, AND PURCHASED PRODUCT MANAGEMENT PROGRAM

CROSS-REFERENCE TO RELATED APPLICATIONS

The present application is a continuation application of U.S. patent application Ser. No. 16/971,718 filed on Aug. 21, 2020, which is a National Stage Entry of International Application PCT/JP2018/009204 filed Mar. 9, 2018, the disclosures of which is incorporated herein in its entirety by reference.

TECHNICAL FIELD

The present invention relates to a self-register (self-checkout) system that automatically manages products purchased by customers, a purchased product management method thereof, and a purchased product management program therefor.

BACKGROUND ART

Stores that sell products, such as convenience stores and supermarkets, have introduced self-checkout systems in which customers themselves operate cash register (hereinafter, referred to as checkout) terminals. In a typical self-checkout system, a customer makes payment by causing the checkout terminal to read a product identification code (for example, a barcode). Since, however, it takes time and effort for the customer to determine the position of the identification code, various methods have been proposed for automatically identifying the product purchased by the customer.

For example, Patent Literature (PTL) 1 describes a product monitoring device that monitors the display state of products. The device described in PTL 1 detects a product from an image of the display area and evaluates the product display state in the display area on the basis of a result of the detection.

In addition, PTL 2 describes a point-of-sales (POS) system for payment of products. The POS system described in PTL 2 detects the flow line of a customer by using a captured image, identifies a customer who intends to make a payment for a product, and recognizes the product for payment with the product displayed in a position corresponding to the flow line of the customer as a candidate.

Non Patent Literature (NPL) 1 describes a method of subtracting a background image by using an adaptive Gaussian mixture model.

CITATION LIST

Patent Literature

PTL 1: International Publication No. WO 2015/079622
PTL 2: International Publication No. WO 2015/140853

Non Patent Literature

NPL 1: Zoran Zivkovic, "Improved Adaptive Gaussian Mixture Model for Background Subtraction," Proceedings of the 17th International Conference on Pattern Recognition (ICPR '04), U.S. IEEE Computer Society, August 2004, Volume 2-Volume 02, pp. 28-31

SUMMARY OF INVENTION

Technical Problem

The product monitoring device described in PTL 1 extracts an object from a video by using a general image recognition method. In order to extract an object from a video by using a general image recognition method, however, an image (reference image) that represents the object to be extracted is required. In some cases, however, there are thousands to tens of thousands of products at a convenience store or a supermarket, and these products are generally replaced on a regular basis. Therefore, collecting and updating the reference images for all products causes a problem of extremely high cost.

In addition, although products associated with flow line data are determined to be candidates for a payment process in the system described in PTL 2, it is difficult to specify a product that a customer purchases out of the candidates.

Therefore, it is an object of the present invention to provide a self-checkout system, a purchased product management method, and a purchased product management program capable of properly managing products purchased by customers without preparing images of individual products in advance.

Solution to Problem

According to an aspect of the present invention, there is provided a self-checkout system including: a change detection means for detecting an area of change in a product shelf on which a product has been arranged, on the basis of a captured image of the product; a classification means for classifying the change in the product shelf in the detected area of change; and a shopping list generation means for generating a shopping list for a customer on the basis of the classification of the change in the product shelf and of the shelving information on the product shelf.

According to another aspect of the present invention, there is provided a purchased product management method including: detecting an area of change in a product shelf on which a product has been arranged, on the basis of a captured image of the product; classifying the change in the product shelf in the detected area of change; and generating a shopping list for a customer on the basis of the classification of the change in the product shelf and of the shelving information on the product shelf.

According to still another aspect of the present invention, there is provided a purchased product management program for causing a computer to perform: a change detection process for detecting an area of change in a product shelf on which a product has been arranged, on the basis of a captured image of the product; a classification process for classifying the change in the product shelf in the detected area of change; and a shopping list generation process for generating a shopping list for a customer on the basis of the classification of the change in the product shelf and of the shelving information on the product shelf.

Advantageous Effects of Invention

The present invention enables products purchased by customers to be properly managed without preparing images of individual products in advance.

BRIEF DESCRIPTION OF DRAWINGS

FIG. 6 It depicts an explanatory diagram illustrating an example of a classification result output from an area change classification unit.

FIG. 7 It depicts an explanatory diagram illustrating an example of product-and-person relationship information.

FIG. 18 It depicts an explanatory diagram illustrating an example of flow line data.

FIG. 19 It depicts an explanatory diagram illustrating an example of product-and-person relationship information.

FIG. 20 It depicts an explanatory diagram illustrating an example of integrated product-and-person relationship information.

FIG. 23 It depicts a block diagram illustrating a configuration example of an image processing device 300a.

FIG. 24 It depicts an explanatory diagram illustrating another example of flow line data.

DESCRIPTION OF EMBODIMENT

Hereinafter, exemplary embodiments of the present invention will be described with reference to appended drawings.

Exemplary Embodiment 1

In the first exemplary embodiment, description will be made on a self-checkout system 1 that manages a list of products that a customer plans to purchase (hereinafter, referred to as "shopping list") on the basis of a captured image.

As will be described later, the self-checkout system 1 of this exemplary embodiment detects a change in a product shelf 3 on the basis of a captured image captured by an imaging device 2 and also detects areas of persons and objects that are included in the captured image. Then, the self-checkout system 1 associates the change in the product shelf 3 with an extracted person and integrates the information associated with the person as a reference. Thus, the self-checkout system 1 is configured to associate the change in the product shelf 3 on the basis of the extracted person. As a result, the self-checkout system 1 detects a product that the extracted person intends to purchase.

Figure 1:
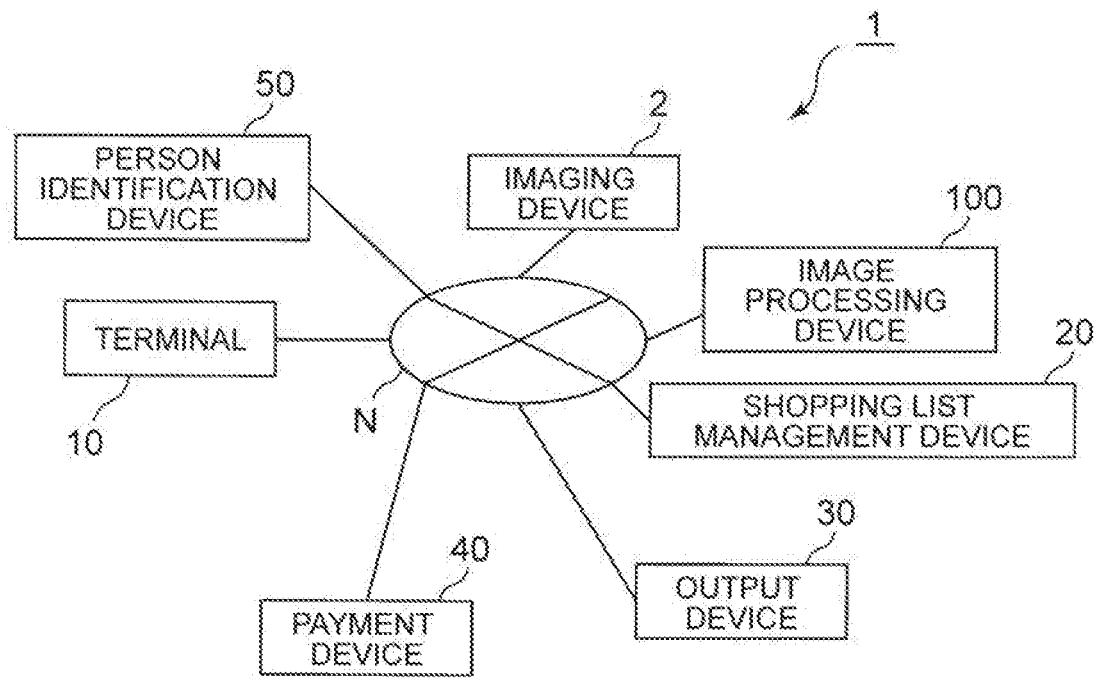
FIG. 1 It depicts a block diagram illustrating a configuration example of a first exemplary embodiment of a self-checkout system according to the present invention.

FIG. 1 is a block diagram illustrating a configuration example of a first exemplary embodiment of a self-checkout system according to the present invention. The self-checkout system 1 of this exemplary embodiment includes a terminal 10 carried by a customer, an image processing device 100, an imaging device 2, a shopping list management device 20, an output device 30, a payment device 40, and a person identification device 50. The terminal 10, the image processing device 100, the imaging device 2, the shopping list management device 20, the output device 30, the payment device 40, and the person identification device 50 are interconnected via, for example, a network N.

In this exemplary embodiment, the image processing device 100, the imaging device 2, and the shopping list management device 20 will be described as separate components. Each component, however, may be built in another device. For example, the imaging device 2 may have a function as the image processing device 100 described later, and the image processing device 100 may have a function as the imaging device 2. Moreover, for example, the image processing device 100 and the shopping list management device 20 may be implemented by the same hardware to receive an image captured by the imaging device 2 and to perform the respective processes described later.

In addition, FIG. 1 illustrates a case of a single imaging device 2. The number of imaging devices 2 included in the self-checkout system 1, however, is not limited to one, and may be two or more.

Figure 2:
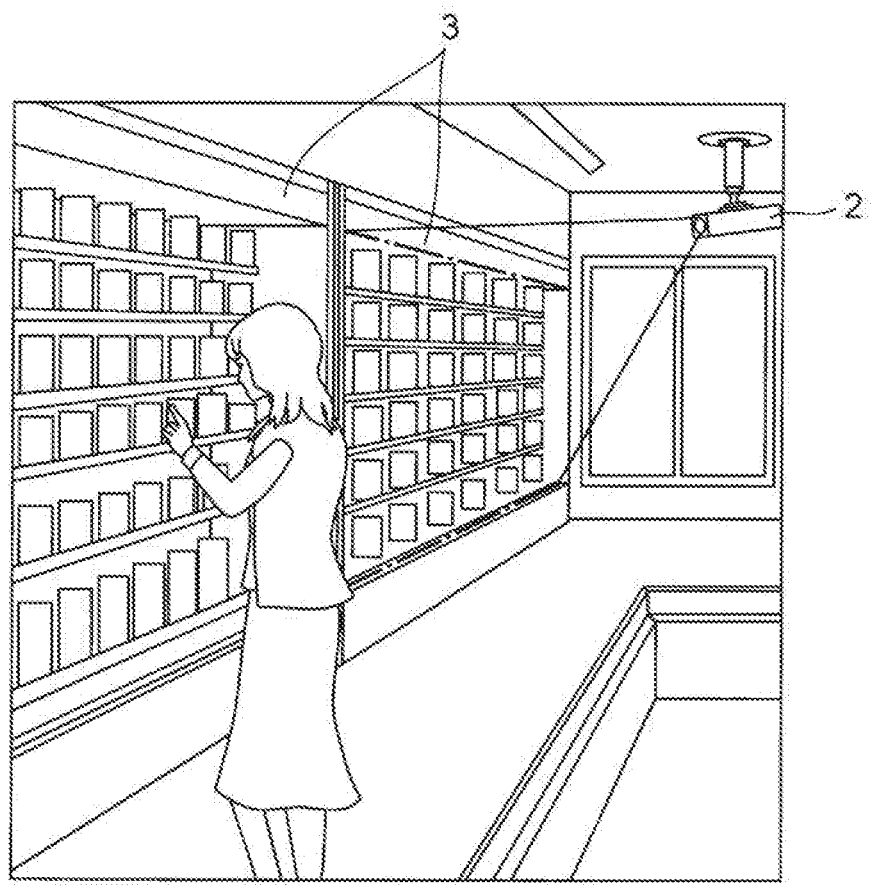
FIG. 2 It depicts an explanatory diagram illustrating an example of a use scene of a self-checkout system 1.

FIG. 2 is an explanatory diagram illustrating an example of a use scene of the self-checkout system 1. Referring to FIG. 2, in the self-checkout system 1, the imaging device 2 captures an image of the product shelf 3 in the store. Then, the imaging device 2 sends a video signal indicating the captured image captured by the imaging device 2 to the image processing device 100.

The imaging device 2 is, for example, a security camera installed in a store or the like. The imaging device 2 is installed, for example, at a predetermined position where the product shelf 3 can be imaged in a store or the like. In addition, a camera ID or the like for identifying the imaging device 2 is assigned in advance to the imaging device 2. The imaging device 2 acquires a captured image. At this time, the imaging device 2 refers to, for example, its own clock or the like and associates the imaging time, which is the time when the captured image was acquired, with the acquired captured image. In this way, the imaging device 2 acquires the captured image representing the state of the product shelf 3 and the like.

The video captured by the imaging device 2 may be a moving image or be composed of continuous still images. Further, in this exemplary embodiment, the captured image acquired by the imaging device 2 is at least one of a color image (hereinafter, referred to as "RGB [red green blue] image") and a range image. The captured image acquired by the imaging device 2 may be, for example, an image in a color space other than the RGB image color space.

As described above, the imaging device 2 sends the video signal indicating the acquired captured image to the image processing device 100. The imaging device 2 may store the captured image in the inside of the imaging device 2 or in a storage device different from the image processing device 100.

The image processing device 100 is an information processing device that classifies a change in the product shelf by analyzing the captured image of the product.

Figure 3:
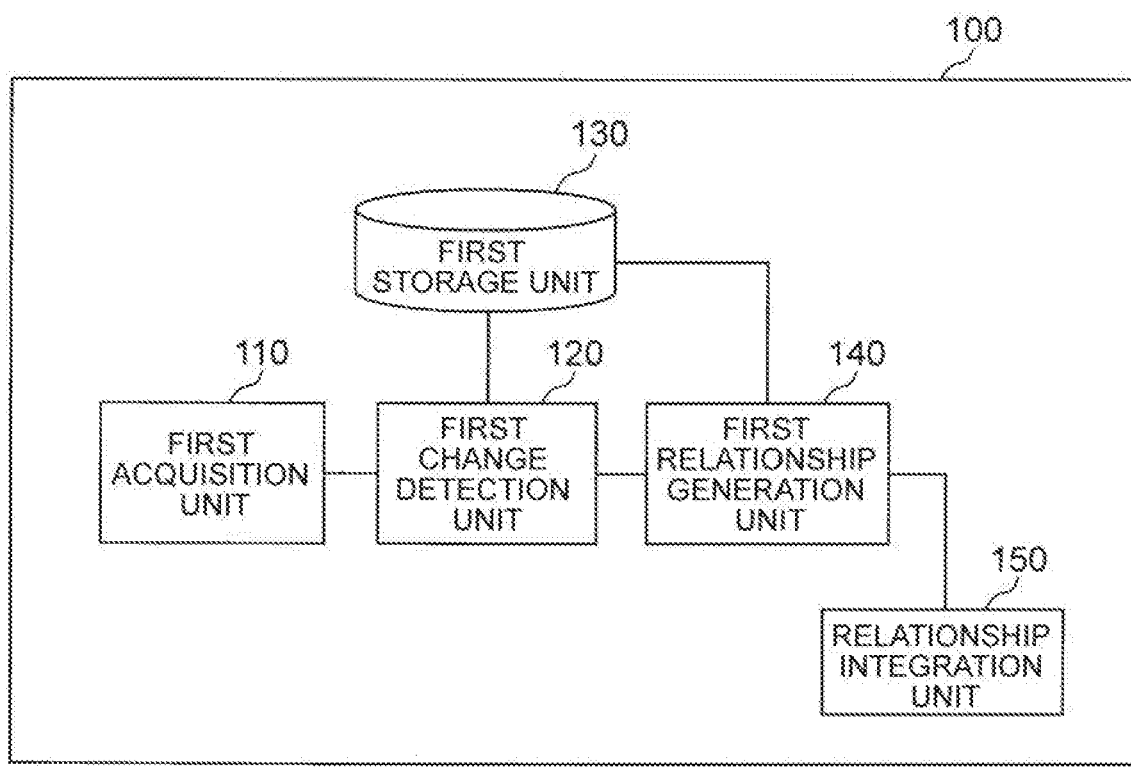
FIG. 3 It depicts a block diagram illustrating a configuration example of an image processing device 100.

FIG. 3 is an explanatory diagram illustrating a configuration example of the image processing device 100. The image processing device 100 of this exemplary embodiment includes a first acquisition unit 110, a first change detection unit 120, a first storage unit 130, a first relationship generation unit 140, and a relationship integration unit 150. Specifically, the image processing device 100 includes, for example, an arithmetic device and a storage device (not illustrated). Then, the image processing device 100 implements each of the above processing units, for example, by executing programs stored in the storage device on the arithmetic device.

Note that the image processing device 100 illustrated in FIG. 3 represents a configuration unique to the present disclosure. The image processing device 100 may have a member not illustrated in FIG. 3. This is the same as for the second and subsequent exemplary embodiments.

The first acquisition unit 110 acquires the video signal indicating the captured image acquired by the imaging device 2 that images the product shelf 3. The first acquisition unit 110 may receive the video signal sent from the imaging device 2. The first acquisition unit 110 may acquire a video signal converted based on the captured image stored in the inside of the imaging device 2 or in a storage device different from the imaging device 2 and the image processing device 100.

As described above, the image processing device 100 may be built in the imaging device 2. In this configuration, the first acquisition unit 110 may be configured to acquire a captured image itself.

The first acquisition unit 110 converts the acquired video signal to at least one or both of the RGB image and the range image that constitute the video signal. Then, the first acquisition unit 110 supplies the converted image (at least one or both of the RGB image and the range image) to the first change detection unit 120. Note that the RGB image and range image, which have been acquired by the first acquisition unit 110 by converting the video signal, represent captured images of the product shelf 3 captured by the imaging device 2 and therefore are also simply referred to as "captured images."

Figure 4:
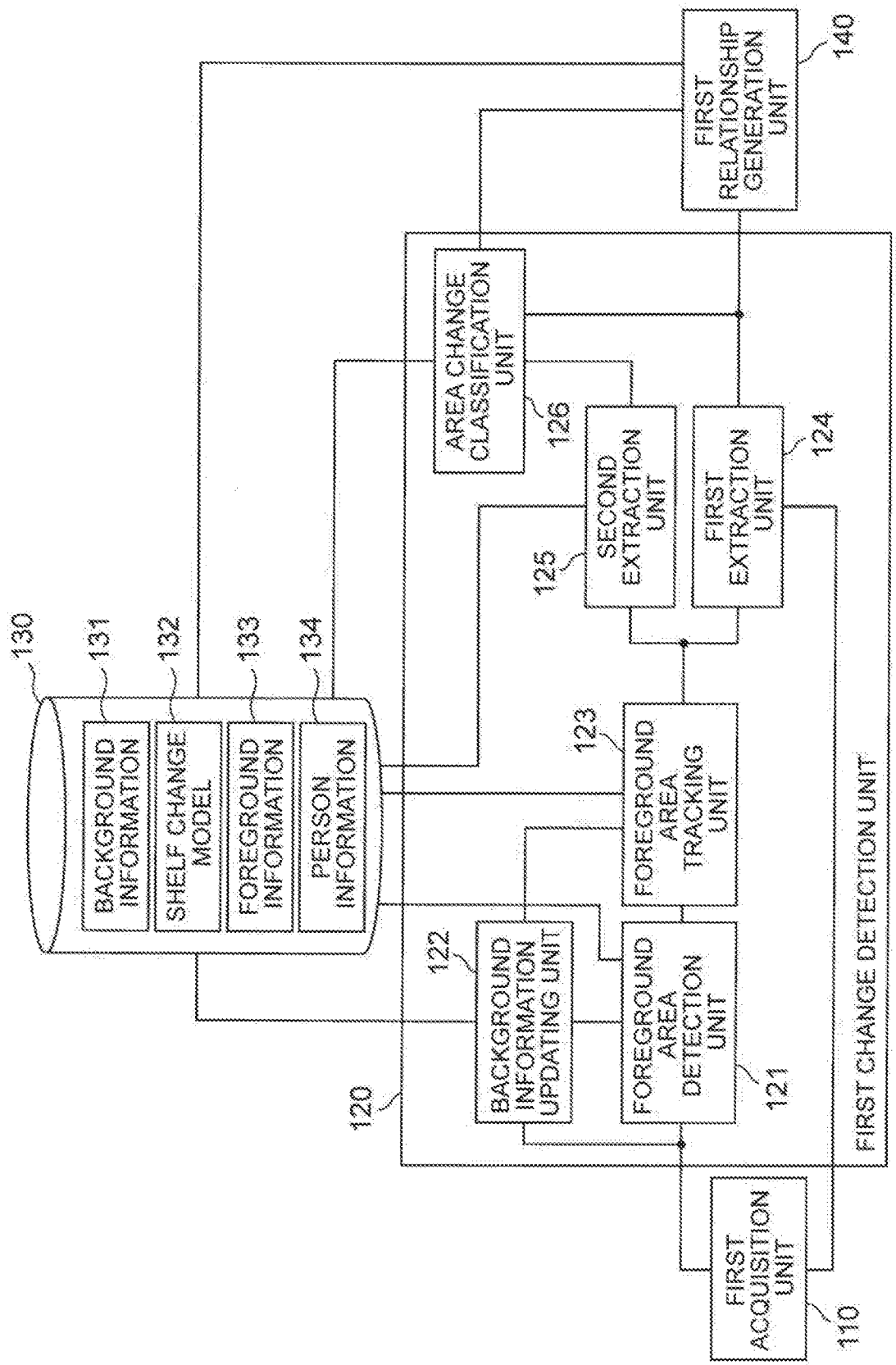
FIG. 4 It depicts a block diagram illustrating a configuration example of a first change detection unit and a first storage unit.

FIG. 4 is a block diagram illustrating a configuration example of the first change detection unit 120 and the first storage unit 130. Referring to FIG. 4, the first change detection unit 120 and the first storage unit 130 will be described below.

The first storage unit 130 is a storage device such as a hard disk or a memory. The first storage unit 130 stores background information 131, a shelf change model 132, foreground information 133, and person information 134. The first storage unit 130 may be implemented by a storage device different from the image processing device 100, or may be built in the first change detection unit 120. Furthermore, the background information 131, the shelf change model 132, the foreground information 133, and the person information 134 may be stored in the same storage device or may be stored in different storage devices.

The background information 131 is a reference image for a comparison with the captured image performed by the first change detection unit 120. The background information 131 is also referred to as "background image." The background information 131 is preferably the same type of image as, for example, the captured image. For example, in the case where the captured image is an RGB image, it is preferable that the background information 131 is also an RGB image. The background information 131 may be a captured image initially supplied to the first change detection unit 120 from the first acquisition unit 110, or may be an image given in advance.

Furthermore, as described later, the background information 131 is updatable information. The details of the process performed when updating the background information 131 will be described later.

The shelf change model 132 is a model of the change in the product shelf 3, which has been learned in advance. The shelf change model 132 is previously stored, for example, in the first storage unit 130. The shelf change model 132 may be obtained by learning with machine learning such as, for example, the convolutional neural network, which is known widely in general.

The shelf change model 132 represents, for example, "a change caused by that a product is no longer contained in the product shelf 3" or "a change caused by that a product is contained anew in the product shelf 3," which have been learned by using an image in which the product is contained in the product shelf 3 and an image in which the product is not contained in the product shelf 3. In addition, the shelf change model 132 represents "a change caused by a different appearance of a product displayed on the product shelf 3," which has been learned by using an image of a plurality of products and a plurality of images in which the shape of each product has changed. Furthermore, the shelf change model 132 represents "a change caused by the presence of a person in front of the product shelf 3," "a change caused by the presence of a shopping cart in front of the product shelf 3," and the like which have been learned by using a captured image captured with no physical object in front of the product shelf 3 and a captured image captured with a physical object such as a person in front of the product shelf 3. Furthermore, the shelf change model 132 may represent, for example, "a change caused by a change in illumination," which has been learned by using images in various environments.

The learning data of the shelf change model 132 may be, for example, a 6-channel image, in which two RGB images before and after the change are combined, or may be a 2-channel image, in which any one of the R, G, and B components of one RGN image before the change is combined with that of the other RGB image after the change. Moreover, the learning data may be, for example, a 4-channel image, in which any two of the R, G, and B components of one RGB image before the change are combined with those of the other RGB image after the change, or may be a 2-channel image, in which two RGB images before and after the change are converted to gray scale images and then combined. Moreover, the learning data may be an image obtained by converting RGB images before and after the change to images in another color space such as HSV (hue saturation value) color space, and combining one or more channels in the color space after the conversion to another color space.

Furthermore, the learning data of the shelf change model 132 may be generated from a color image such as an RGB image, or may be generated by using both of a color image and a range image.

The foreground information 133 is stored by a foreground area detection unit 121. The foreground information 133 includes information indicating a foreground area (area of change) that is an area different from the background image of the RGB image, where the area is detected by the foreground area detection unit 121 as a result of a comparison between the background information 131, which is a background image, and the RGB image, which is a captured image. Specifically, the foreground information 133 is a binary image associated with the imaging time of the captured image, for example. The details of the process of storing the foreground information 133 will be described later.

The person information 134 is stored by the foreground area tracking unit 123. The person information 134 is generated by associating, for example, the ID of the imaging device (camera ID), the person ID, the position on the captured image, the imaging time of the captured image, or the like with a person area extracted by the foreground area tracking unit 123. As will be described later, the person area is, for example, an RGB image. In other words, the person information 134 is allowed to include information indicating, for example, the color, dimensions, shape, and aspect ratio of a circumscribing rectangle of the stored person area. The details of the process of storing the person information 134 will be also described later.

The first change detection unit 120 detects the area of change related to the product shelf 3.

For example, in the case where a product displayed on the product shelf 3 included in the captured image is not included in an image (for example, the background image) acquired previous to the captured image, the first change detection unit 120 detects the area of the product. Furthermore, for example, in the case where a product displayed on the product shelf 3 included in the background image is not included in the captured image, the first change detection unit 120 detects the area of the product. Moreover, for example, in the case where the product displayed on the product shelf 3 included in the captured image is different in appearance from the product included in the background image, the first change detection unit 120 detects the area of the product. In this manner, the first change detection unit 120 detects changes in the display state of products such as a decrease in products (lost), an increase in products (appeared anew), a difference in appearance of a product, and the like, on the basis of the captured image.

Furthermore, for example, in the case where the captured image is captured when a person or an object is present between the product shelf 3 and the imaging device 2, the first change detection unit 120 detects the area of the person or object included in the captured image of the product shelf 3.

As described above, the first change detection unit 120 detects an area of change related to the product shelf 3, such as an area of change in the inside of the product shelf 3, which is an area where the product display state has changed, or an area of change in the captured image of a person or an object present between the product shelf 3 and the imaging device 2.

As illustrated in FIG. 4, the first change detection unit 120 includes the foreground area detection unit 121, a background information updating unit 122, the foreground area tracking unit 123, a first extraction unit 124, a second extraction unit 125, and an area change classification unit 126.

The foreground area detection unit 121 receives the captured image supplied from the first acquisition unit 110. Moreover, the foreground area detection unit 121 acquires background information 131 corresponding to the captured image from the first storage unit 130. As described above, the background information 131 is an RGB image. The foreground area detection unit 121 compares the captured image and the background information 131, which are two RGB images, with each other. Then, the foreground area detection unit 121 detects an area changed between the two RGB images compared with each other, as an area of change. Since the foreground area detection unit 121 compares the background information 131, which is a background image, with the RGB image, which is a captured image, it can also be said that the foreground area detection unit 121 performs a process of detecting the foreground area, which is an area different from the background image.

In this exemplary embodiment, the method in which the foreground area detection unit 121 detects the area of change is not particularly limited. The foreground area detection unit 121 may detect the area of change by using an existing technique. The foreground area detection unit 121 may detect the area of change by using, for example, a background subtraction method. The foreground area detection unit 121 may generate a binary image in which the pixel value of the detected area of change is represented by 255 and other pixel values are each represented by 0.

Figure 5A:
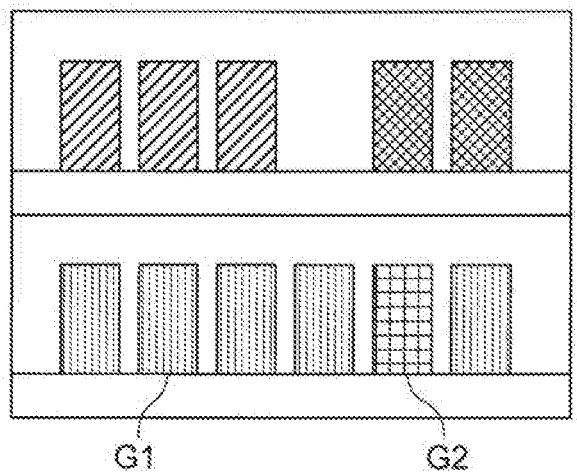
FIG. 5a through 5c It depicts an explanatory diagram illustrating an example of operation of a foreground area detection unit.
Figure 5B:
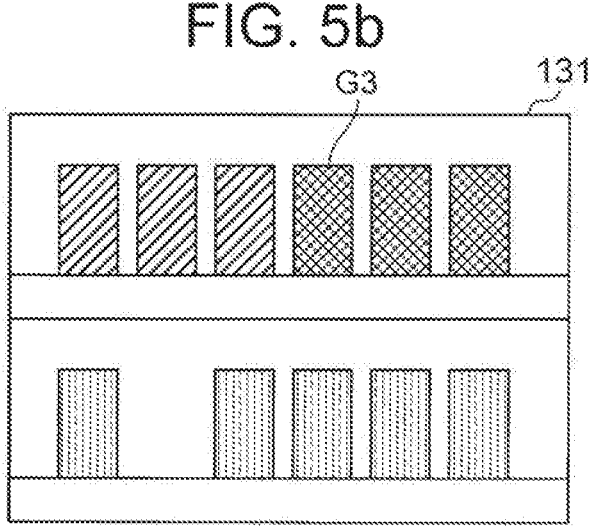
Figure 5C:
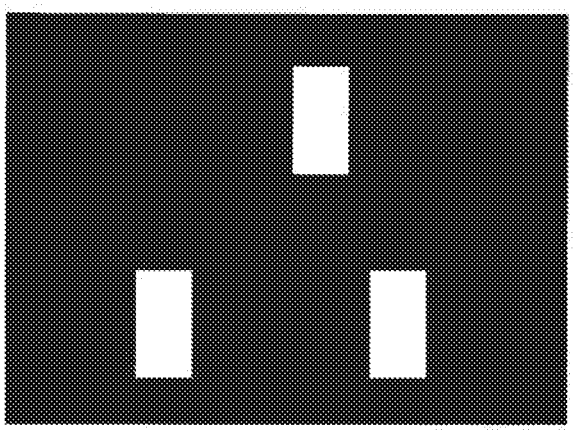

The following describes an example of the operation of the foreground area detection unit 121 more specifically with reference to FIG. 5a through 5c. FIG. 5a through 5c is an explanatory diagram illustrating an example of operation of the foreground area detection unit 121. FIG. 5a illustrates an example of a captured image, and FIG. 5b illustrates an example of the background information 131 corresponding to the captured image stored in the first storage unit 130. Moreover, FIG. 5c illustrates an example of a binary image that is a detection result of the area of change.

Referring to FIGS. 5a and 5b, there are differences between the captured image and the background information 131 in the three areas of products G1, G2, and G3. For example, in the cases illustrated in FIGS. 5a and 5b, the product G1 is not included in the background information 131, but included in the captured image. Moreover, the product G3 is included in the background information 131, but not included in the captured image. Furthermore, another product is displayed on the background information 131 at the position of the product G2 included in the captured image. Therefore, the foreground area detection unit 121 detects the area of the product G2 as an area in which a change has occurred. In this case, the foreground area detection unit 121 generates a binary image in which the parts corresponding to the areas of the products G1, G2, and G3 are represented in white and other parts are represented in black, for example, as illustrated in FIG. 5c.

In the following description, an area of change is a white part as illustrated in FIG. 5c. In other words, the area of change is, for example, a set of pixels with a pixel value of 255 and with any of the pixels adjacent to those pixels having a pixel value of 255. In the example illustrated in FIG. 5c, the foreground area detection unit 121 detects three areas of change.

As described above, the foreground area detection unit 121 generates a binary image having the same size as the captured image, for example. Furthermore, the foreground area detection unit 121 associates a binary image that is a detection result with the imaging time of the captured image used to generate the binary image. The foreground area detection unit 121 may associate the binary image with the information indicating the captured image used to generate the binary image, the information indicating the background information 131, or the like. Then, the foreground area detection unit 121 supplies the detection result associated with the imaging time of the captured image or the like to the background information updating unit 122 and to the foreground area tracking unit 123. Furthermore, the foreground area detection unit 121 stores the detection result associated with the imaging time of the captured image, as the foreground information 133, into the first storage unit 130.

Note that the result of the detection by the foreground area detection unit 121 only needs to include information indicating the detected area of change. The foreground area detection unit 121 may associate, for example, the information indicating the position of the detected area of change (the area where the pixel value is 255) and its size with the information indicating the captured image used to detect the area of change and with the information indicating the background image and may output the association result as a detection result. In this manner, the detection result output by the foreground area detection unit 121 may be in any format.

In addition, the foreground area detection unit 121 may associate the imaging time of the captured image with the binary image, which is the detection result, and may also associate color information contained in the area of change extracted from the captured image with the binary image. The foreground area detection unit 121 may associate the image of the area of change with the detection result, instead of the color information of the area of change. Thus, the foreground area detection unit 121 may associate information other than the imaging time with the detection result.

Furthermore, as illustrated in FIG. 5c, the binary image generated by the foreground area detection unit 121 sometimes includes a plurality of areas of change. In such a case, the foreground area detection unit 121 may generate a binary image for each area of change. The method in which the foreground area detection unit 121 generates the binary image for each area of change will be described later as a modification of the foreground area detection unit 121.

The foreground area tracking unit 123 tracks the area of change detected by the foreground area detection unit 121 among a plurality of captured images. The foreground area tracking unit 123 supplies binary images to the first extraction unit 124 and to the second extraction unit 125 or extracts a person area, according to the tracking result. The foreground area tracking unit 123 also supplies an update signal indicating an update of the background information 131 to the background information updating unit 122.

The foreground area tracking unit 123 receives the detection result (binary image) supplied from, for example, the foreground area detection unit 121. The foreground area tracking unit 123 acquires the foreground information 133, which is a binary image generated from the captured image that has been captured before the imaging time of the captured image related to the binary image, which is associated with the binary image that is the detection result, from the first storage unit 130. Then, the foreground area tracking unit 123 tracks the area of change by performing a process of linking the respective areas of change each represented by a binary image.

The foreground area tracking unit 123 is able to track an area of change by using various methods. The foreground area tracking unit 123 calculates similarity, for example, on the basis of at least one of the dimensions, shape, and aspect ratio of a circumscribing rectangle of the area of change, which is represented by the binary image supplied from the foreground area detection unit 121 and the foreground information 133 acquired from the first storage unit 130. Further, the foreground area tracking unit 123 tracks the area of change by linking the areas of change each having the highest calculated similarity with each other. Furthermore, in the case of a configuration in which color information is associated with the detection result, the foreground area tracking unit 123 may perform the tracking by using the color information. The foreground area tracking unit 123 may perform the tracking on the basis of the image of the area of change associated with the detection result.

The foreground area tracking unit 123 confirms whether the tracking result is a predetermined time or longer, or whether the moving distance of the area of change is a predetermined threshold or more. Note that the predetermined time and the predetermined threshold used for the confirmation by the foreground area tracking unit 123 are arbitrary.

In the case where the moving distance of the area of change is less than the predetermined threshold and the tracking result is the predetermined time or longer, the foreground area tracking unit 123 supplies the binary image, which is the detection result supplied from the foreground area detection unit 121, to the first extraction unit 124 and to the second extraction unit 125. At this time, the foreground area tracking unit 123 adds, for example, information indicating the captured image used to generate the binary image and information indicating the background information 131 to the binary image and supplies the binary image to the first extraction unit 124 and to the second extraction unit 125. The foreground area tracking unit 123 may supply, for example, the corresponding captured image and background information 131 along with the binary image to the first extraction unit 124 and to the second extraction unit 125. Moreover, in the case where the binary image includes a plurality of areas of change and one of the areas of change has not been tracked for a predetermined time or longer, the foreground area tracking unit 123 may supply the binary image to the first extraction unit 124 and to the second extraction unit 125 together with the information indicating the area of change tracked for the predetermined time or longer.

In the case where the binary image includes a plurality of areas of change, the foreground area tracking unit 123 may generate a plurality of binary images such that one binary image includes one area of change. For example, a binary image including only the area of change that has been tracked for the predetermined time or longer may be supplied to the first extraction unit 124 and to the second extraction unit 125, and a binary image including the area of change that has not been tracked for the predetermined time or longer track may be discarded. Note that the foreground area tracking unit 123 may receive the binary image for each area of change as the detection result from the foreground area detection unit 121.

In the case where the moving distance of the area of change is equal to or more than the predetermined threshold, the foreground area tracking unit 123 determines that the object included in the area of change is a moving body. If the object included in the area of change is determined to be a moving body in this manner, the foreground area tracking unit 123 inhibits supplying the area of change to the first extraction unit 124 and to the second extraction unit 125. As a result, the image processing device 100 is able to delete changes related to the product shelf 3 that are irrelevant to the increase or decrease of products, such as "a change caused by the presence of a person in front of the product shelf 3." This enables the product display state to be monitored more accurately.

Note that the foreground area tracking unit 123 may supply the determination result, in which the object included in the area of change is determined to be a moving body, to the first extraction unit 124 and to the second extraction unit 125 in association with the area of change. Furthermore, in the case where the determination result is associated with the area of change, the area change classification unit 126 may classify the change related to the product shelf 3 in this area of change as a type of change related to an object other than a product displayed on the product shelf 3. For example, the area change classification unit 126 may classify the change related to the product shelf 3 in the area of change as the type of change related to an object other than a product, such as "a change caused by the presence of a person in front of the product shelf 3," "a change caused by the presence of a shopping cart in front of the product shelf 3," or the like.

The foreground area tracking unit 123 extracts the area of change determined to be a moving body from the captured image, as a person area. Specifically, the foreground area tracking unit 123 uses the captured image and the binary image that has the same size as the captured image to extract an image in an area on the captured image corresponding to the area where the pixel value is 255 in the binary image, as a first attention image. For example, in the case where the captured image is an RGB image, the extracted person area is also an area of an RGB image.

For each area of change determined to be a moving body, the foreground area tracking unit 123 may extract a person area of the same shape as the area of change or may extract an area enclosed by a frame of the same shape as the predetermined shape circumscribing the area of change as a person area. The shape of the frame circumscribing the area of change may be, for example, a rectangle, an ellipse, or any other shape. Moreover, the foreground area tracking unit 123 may extract an area enclosed by a frame that is larger than the frame circumscribing the area of change by a predetermined size as a person area.

Subsequently, the foreground area tracking unit 123 associates an ID of the imaging device 2 (camera ID), a person ID assigned to, for example, each extracted person area, a position on a captured image, the imaging time of the captured image, and the like with the extracted person area. Then, the foreground area tracking unit 123 stores the associated information into the first storage unit, as person information 134. The position on the captured image may be represented by the coordinate values of the four corners of the circumscribing rectangle of the area of change determined to be a moving body, for example, or may be represented by the coordinate value of at least one of the four corners and the width and height of the circumscribing rectangle.

Furthermore, the foreground area tracking unit 123 supplies an update signal indicating an update of the background information 131 to the background information updating unit 122.

For example, in the case of supplying the detection result indicating the area of change to the first extraction unit 124 and to the second extraction unit 125 after tracking the area of change, the foreground area tracking unit 123 supplies an update signal with a vale of 1 along with information indicating the area of change to the background information updating unit 122. The update signal with the value of 1 indicates that the image of the part corresponding to the area of change in the background information 131 is to be updated. Moreover, in the case of not supplying the detection result to the first extraction unit 124 and to the second extraction unit 125, the foreground area tracking unit 123 may supply an update signal with a value of 0 along with the information indicating the area of change to the background information updating unit 122. The update signal with the value of 0 indicates that the image of the part corresponding to the area of change in the background information 131 is not to be updated. The case where the detection result is not output to the first extraction unit 124 and to the second extraction unit 125 means, for example, a case where the tracking result is less than a predetermined time, or a case where the moving distance of the area of change is equal to or more than a predetermined threshold.

The foreground area tracking unit 123 may supply the update signal indicating an update of the background information 131 to the background information updating unit 122 at a timing other than the above example. In the case where it is determined that a product included in the area of change is likely to have been purchased or added, for example, on the basis of product purchase information or purchase-of-stock information, store worker work information, and the like sent from an external device (not illustrated) of the image processing device 100, the foreground area tracking unit 123 may output an update signal with a value of 1 to update the background of the product shelf 3. The foreground area tracking unit 123 may supply the update signal indicating the update of the background information 131 to the background information updating unit 122 on the basis of the tracking time or the like included in the tracking result.

On the basis of the captured image supplied from the first acquisition unit 110, the detection result supplied from the foreground area detection unit 121, the background information 131 (for example, an RGB image) stored in the first storage unit 130, and the update signal supplied from the foreground area tracking unit 123, the background information updating unit 122 updates the background information 131. The method in which the background information updating unit 122 updates the background information 131 is not particularly limited. The background information updating unit 122 may update the background information 131 by using the same method as the method described in NPL 1, for example.

Note that the background information updating unit 122 does not need to update, for example, the image of the part that corresponds to the area of change indicated by the detection result supplied from the foreground area detection unit 121, in the image indicated by the background information 131. For example, in the case of receiving the above-described update signal with a value of 0 from the foreground area tracking unit 123, the background information updating unit 122 does not update the background information of the area corresponding to the area of change.

As described above, in the case of not outputting the detection result to the first extraction unit 124 and to the second extraction unit 125, the foreground area tracking unit 123 supplies the update signal with the value of 0 to the background information updating unit 122. If the tracking result satisfies a first predetermined condition in this manner, the background information updating unit 122 receives the update signal with the value of 0 and does not update the background information of the area corresponding to the area of change. In other words, if the tracking result satisfies the first predetermined condition, the background information updating unit 122 updates the background information 131 except the area corresponding to the area of change. As a result, the area corresponding to the area that has not been updated in the captured image acquired next by the first acquisition unit 110 is easily detected as an area of change by the foreground area detection unit 121.

Moreover, for example, in the case where the update signal supplied from the foreground area tracking unit 123 has a value of 1, the background information updating unit 122 updates the image of the part corresponding to the area of change indicated by the detection result supplied from the foreground area detection unit 121 in the RGB image indicated by the background information 131. As described above, if the tracking result is predetermined time or longer, the foreground area tracking unit 123 supplies the detection result representing the tracked area of change to the first extraction unit 124 and to the second extraction unit 125, and also supplies an update signal with a value of 1 to the background information updating unit 122. In other words, if the second predetermined condition that the tracking result is a result of tracking for a predetermined time or longer is satisfied, the background information updating unit 122 receives the update signal with the value of 1 from the foreground area tracking unit 123, and updates the image of the part corresponding to that area of change in the background information 131. Thereby, the background information updating unit 122 is able to bring the background information 131 stored in the first storage unit 130 closer to the captured image acquired by the first acquisition unit 110 at that time. Therefore, the image processing device 100 is able to prevent the foreground area detection unit 121 from detecting the area in the captured image, which is acquired next by the first acquisition unit 110 in response to the above area of change, as an area of change.

The first extraction unit 124 receives a binary image, which is a detection result, from the foreground area tracking unit 123. In addition, the first extraction unit 124 acquires the captured image used to generate the binary image from the first acquisition unit 110. Note that the first extraction unit 124 may receive the captured image together with the binary image from the foreground area tracking unit 123.

The first extraction unit 124 extracts the image of the area of change from the captured image. Specifically, the first extraction unit 124 uses the captured image and the binary image, which has the same size as the captured image, to extract the image of the area in the captured image corresponding to the area where the pixel value in the binary image is 255, as a first attention image. For example, if the binary image is as illustrated in FIG. 5c, the first extraction unit 124 extracts three first attention images from the captured image. For example, in the case where the captured image is an RGB image, the extracted first attention images are RGB images, too.

Note that the first extraction unit 124 may extract the first attention image of the area that has the same shape as the area of change for each area of change, or may extract an image of an area enclosed by a frame of the same shape as the frame of a predetermined shape circumscribing the area of change, as the first attention image. The shape of the frame circumscribing the area of change may be, for example, a rectangle, an ellipse, or any other shape. Moreover, the first extraction unit 124 may extract an image of an area enclosed by a frame that is larger than the frame circumscribing the area of change by a predetermined size, as the first attention area.

The first extraction unit 124 supplies the extracted first attention image to the area change classification unit 126. The area in the captured image of the first attention image extracted by the first extraction unit 124 is also referred to as "first attention area." Moreover, the first extraction unit 124 acquires the position information of the first attention area, associates the position information with the imaging time, and supplies them to the first relationship generation unit 140. The position information of the first attention area may be, for example, the coordinate values of the four corners of the circumscribing rectangle of the first attention area or may be represented by the coordinate value of at least one of the four corners and the width and height of the circumscribing rectangle. If the circumscribing rectangle is circular, the position information of the first attention area may be, for example, the center coordinates of the circle and the radius of the circle. If the circumscribing rectangle is elliptic, the position information in the first attention area may be, for example, the center coordinates of the ellipse and the major and minor axes of the ellipse.

The second extraction unit 125 receives the binary image, which is the detection result, from the foreground area tracking unit 123. Moreover, the second extraction unit 125 acquires the background information 131 used to generate the binary image from the first storage unit 130. The second extraction unit 125 may receive the background information 131 together with the binary image from the foreground area tracking unit 123.

The second extraction unit 125 extracts the image of the area of change from the background information 131. Specifically, the second extraction unit 125 extracts the image of an area on the background information 131 corresponding to the area where the pixel value is 255 in the binary image, as the second attention image, by using the background information 131, which is background information, and the binary image. A method of extracting the second attention image is the same as the method of extracting the first attention image. The second extraction unit 125 supplies the extracted second attention image to the area change classification unit 126. The area on the background information 131 of the second attention image extracted by the second extraction unit 125 is also referred to as "second attention area."

The area change classification unit 126 classifies a change related to the product shelf 3 in the area of change and supplies the classification result to the first relationship generation unit 140. On the basis of the first attention area and the second attention area, which have been supplied from the first extraction unit 124 and the second extraction unit 125, and the shelf change model 132 stored in the first storage unit 130, the area change classification unit 126 classifies the change from the state of the image of the area corresponding to the detected area of change on the background image to the state of the image of the area corresponding to the area of change on the captured image.

The state of the image means, for example, a state where the image includes a product or does not include any product, a state where the image includes a customer or does not include any customer, a state where the image includes a shopping basket or does not include any shopping basket, a state where the image includes a shopping cart or does not include any shopping cart, or the like. On the basis of the shelf change model 132, the area change classification unit 126 classifies changes related to the product shelf 3 in the area of change into the types of changes such as, for example, "a change caused by that a product is no longer contained in the product shelf 3," "a change caused by that a product is contained anew in the product shelf 3," "a change caused by a different appearance of a product displayed on the product shelf 3," "a change caused by the presence of a person in front of the product shelf 3," "a change caused by the presence of a shopping cart in front of the product shelf 3," "a change caused by a change in illumination," and the like. The types into which the area change classification unit 126 classifies the changes in the state of the area of change are illustrative, and not limited thereto.

For example, "a change caused by that a product is no longer contained in the product shelf 3" can also be referred to as "a change caused by a product having been taken," and "a change caused by that a product is contained anew in the product shelf 3" can also be referred to as "a change caused by a product having been arranged on the product shelf." Moreover, for example, "a change caused by a change in illumination" can also be referred to as "a change in a store environment of the product shelf." Furthermore, the area change classification unit 126 may classify the change in the product shelf as "a change caused by a different appearance of the product." "A change caused by a different appearance of the product shelf 3" may be classified in further detail, such as, for example, as "a change in appearance caused by a different product having been arranged" or "a change in appearance caused by a change in product attitude" or the like.

More specifically, the area change classification unit 126 receives the first attention image from the first extraction unit 124. Moreover, the area change classification unit 126 receives the second attention image from the second extraction unit 125. Then, on the basis of the shelf change model 132 stored in the first storage unit 130, the area change classification unit 126 classifies a change from the state of the second attention image to the state of the first attention image corresponding to that second attention image, for example, as any one of the above-described types. In other words, the area change classification unit 126 classifies the change from the state of the second attention image to the state of the first attention image on the basis of the result of comparison with the shelf change model 132.

FIG. 6 is an explanatory diagram illustrating an example of a classification result output from the area change classification unit 126. The area change classification unit 126 outputs the classification result 90, for example, illustrated in FIG. 6.

As illustrated in FIG. 6, the classification result 90 includes, for example, a second attention image 91, a first attention image 92, and a type of change 93. The classification result 90 illustrated in FIG. 6 is an example, and the classification result 90 may include information other than the information illustrated in FIG. 6. The classification result 90 may include, for example, information about the captured image (identifier, imaging time, and the like), information indicating the position of the first attention image 92 in the captured image, and the like.

The area change classification unit 126 may classify a change related to the product shelf 3 as any one of the above types, for example, by using a machine learning method (convolutional neural network or the like) in which the shelf change model 132 is created.

The above is an example of the configuration of the first change detection unit 120.

The first relationship generation unit 140 receives the classification result of the area of change and the position information of the area of change from the first change detection unit 120. Moreover, the first relationship generation unit 140 acquires the person information 134 from the first storage unit 130. Then, on the basis of the imaging time of the area of change corresponding to the position information of the area of change and the imaging time of the person tied to the person information 134, the first relationship generation unit 140 generates product-and-person relationship information, which indicates the relationship between the product corresponding to the area of change (the change in the display state of the product) and the person. Thereafter, the first relationship generation unit 140 supplies the generated product-and-person relationship information to the relationship integration unit 150.

Specifically, out of the persons imaged before the imaging time for which the area of change was detected, the first relationship generation unit 140 extracts a person who intersects with the area of change. Then, the first relationship generation unit 140 associates the person imaged at the time closest to the imaging time of the area of change among the extracted persons with the area of change.

FIG. 7 is an explanatory diagram illustrating an example of product-and-person relationship information generated by the first relationship generation unit 140. FIG. 7 illustrates a camera ID that indicates an ID of the imaging device, a person ID that indicates a person imaged by the imaging device, position information of the area of change in the product shelf, and a classification result of the change. In FIG. 7, the position information of the area of change is represented by the coordinate values of one corner of the circumscribing rectangle of the area of change and the width and height of the circumscribing rectangle. In addition, regarding the type of change, "a change caused by a product having been taken" is represented as "a product decrease," and "a change caused by that a product is contained anew in the product shelf 3" is represented as "a product increase."

Note that, however, the relationship information may include the contents themselves classified by the area change classification unit 126. In that case, the shopping list updating unit 22 described later determines the contents of the shopping list to be updated on the basis of the contents of the classification.

The first relationship generation unit 140 may associate, for example, the generated person-and-product relationship information with the person information 134 stored in the first storage unit 130 to supply them to the relationship integration unit 150. Moreover, the first relationship generation unit 140 may add information about the captured image (identifier, imaging time, or the like) to the relationship information.

The relationship integration unit 150 receives the product-and-person relationship information from the first relationship generation unit 140. Then, in the case where the received relationship information contains relationship information of the same person, the relationship integration unit 150 integrates them into one. Thereafter, the relationship integration unit 150 supplies the integrated relationship information to the shopping list management device 20.

The relationship integration unit 150 calculates the similarity, for example, on the basis of at least one of the color, dimensions, shape and aspect ratio of the circumscribing rectangle of the person area stored in the person information 134 of the first storage unit 130. Then, the relationship integration unit 150 determines that the person areas with the highest calculated similarity are of the same person. As described above, the relationship integration unit 150 integrates relationship information determined to be of the same person.

Figures 8, 9:
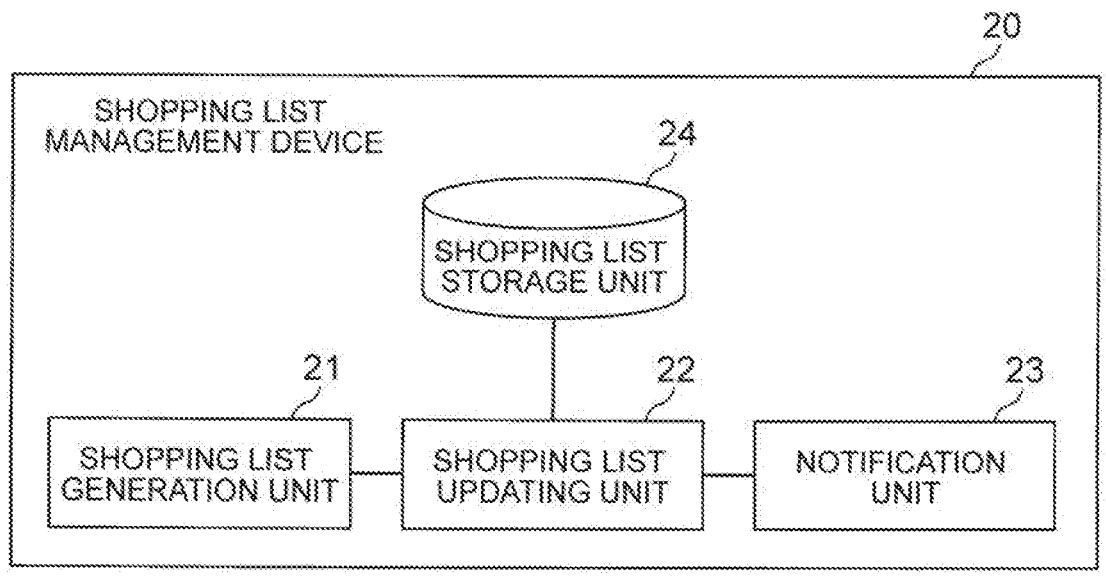
FIG. 8 It depicts an explanatory diagram illustrating an example of integrated product-and-person relationship information.
FIG. 9 It depicts a block diagram illustrating a configuration example of a shopping list management device.

FIG. 8 is an explanatory diagram illustrating an example of integrating the product-and-person relationship information illustrated in FIG. 7. In the example illustrated in FIG. 8, the relationship information of person ID=1 and that of person ID=4 illustrated in FIG. 7 are integrated into one. In addition, the relationship information of person ID=2 and that of person ID=3 illustrated in FIG. 7 are also integrated. In other words, FIG. 8 illustrates an example of a case where a person having the person ID=1 and a person having the person ID=4 illustrated in FIG. 7 are the same person, and a person having the person ID=2 and a person having the person ID=3 illustrated in FIG. 7 are the same person.

In the example illustrated in FIG. 8, as an example of the integration, two person IDs are compared with each other before integrating the relationship information and the person ID with the smaller value is used as the person ID of the relationship information having been integrated, but the person ID with the larger value may be used. In addition, for example, the person ID may be re-assigned after integrating the relationship information. Moreover, the person ID used when the person identification device 50 described later identifies a person may be used or identification information that identifies the terminal 10 carried by a person may be used.

Further, the relationship integration unit 150 may detect that the product has been returned to a different location than the location from which the product was taken, on the basis of the relationship information. The relationship integration unit 150 may detect that a product has been returned to a different location than the location from which the product was taken, for example, by comparing the location where the product was acquired with the location to which the product was returned, or the like.

Hereinafter, the operation of the relationship integration unit 150 will be specifically described with reference to FIG. 8. The relationship integration unit 150 compares position information with the type of change for each person ID. In the example illustrated in FIG. 7, a person with a person ID of 1 acquires a product from the location (10, 0) of the product shelf imaged by an imaging device with a camera ID of 1, and then returns the product to the location (250, 300). In addition, the acquired product and the returned product both have the width and height of the circumscribing rectangle of (30, 50) and are determined to be the same product.

Thus, the relationship integration unit 150 detects that the person with the person ID of 1 returned the product to the same shelf as the shelf where the product was acquired, but to a different location. A person with a person ID of 2 returned the same product to the same location as the location where the product was acquired. Therefore, the relationship integration unit 150 does not detect this action as an action by which a product has been returned to a different location than the location from which the product was taken.

Thus, the relationship integration unit 150 detects that a product has been returned to a different location than the location from which the product was taken, for example, by detecting that the same person returned the product to a different location. Note that the relationship integration unit 150 may detect that a product has been returned to a different location than the location from which the product was taken, for example, even in the case where the product has been returned to the same location but the appearance of the product has changed.

The above is an example of the configurations of the image processing device 100.

The terminal 10 is a device carried by a customer and is implemented by, for example, a mobile terminal, a tablet terminal, or the like. The terminal 10 stores information for identifying a customer and is used when the person identification device 50 described later associates the terminal 10 with the customer (person). The terminal 10 may, for example, display the information for identifying the customer as a label (bar code or the like) or may send the information by near field communication.

In addition, the terminal 10 notifies the customer of various information in a manner that can be perceived by a person (display, vibration, light, voice, or the like) in response to a notification from a notification unit 23 described later. The specific contents of the notification by the notification unit 23 will be described later.

The person identification device 50 is a device that identifies a person. In this exemplary embodiment, the person identification device 50 does not need to identify the characteristics of a person oneself (for example, gender, age, height, and the like), as long as the person identification device 50 is able to identify the person so as to be distinguished from other persons. For example, in the example illustrated in FIG. 8, the person identification device 50 only needs to able to identify the person with the person ID of 1, the person with the person ID of 2, and the person with the person ID of 5 as different persons. The person identification device 50 is installed, for example, at the entrance to the store to identify persons.

In this exemplary embodiment, the person identification device 50 identifies a person on the basis of the captured image. The method in which the person identification device 50 identifies a person is arbitrary. The person identification device 50 may acquire information used by the relationship integration unit 150 described above to calculate the similarity of the person (color, dimensions, shape, and aspect ratio of the circumscribing rectangle of the person area) from the image of a person who has entered the store. In addition, the person identification device 50 may identify the person by using the acquired information.

Further, the person identification device 50 may associate the identified person with the device (terminal 10) carried by the person. Specifically, the person identification device 50 may capture an image of the person when a sensor (not illustrated) installed at the entrance to the store detects the terminal 10 and may associate the person identified in the captured image with the identification information of the terminal 10. In this case, the person identification device 50 is implemented by a device including an imaging device and a sensor. The imaging device and the sensor may be implemented by pieces of hardware different from each other. Moreover, the device carried by a person is not limited to hardware such as a mobile phone, but may be a medium such as, for example, an IC card.

Specifically, the customer may start an application program installed in the terminal 10 to display the customer identification information. When the customer then causes the person identification device 50 to identify the identification information, the person identification device 50 may associate the person with the terminal 10.

FIG. 9 is a block diagram illustrating a configuration example of the shopping list management device 20. The shopping list management device 20 manages a shopping list for each person. The shopping list management device 20 includes a shopping list generation unit 21, a shopping list updating unit 22, a notification unit 23, and a shopping list storage unit 24.

The shopping list storage unit 24 stores the shopping list for each person. The shopping list storage unit 24 may store the shopping list with being linked with the person ID described above, for example. Further, the shopping list storage unit 24 may store the shopping list with being linked with an identifier given by the person identification device 50 described above when identifying the person. Moreover, if the person is linked with the terminal 10, the shopping list storage unit 24 may store the person and the terminal 10 with being linked with the shopping list.

The shopping list generation unit 21 generates a shopping list and registers it in the shopping list storage unit 24. For example, when the person identification device 50 identifies a person, the shopping list generation unit 21 may generate a shopping list that corresponds to the person. Moreover, for example, when the person identification device 50 associates the person with the terminal 10, the shopping list generation unit 21 may generate a shopping list that corresponds to the person. In this case, the shopping list is linked with the terminal 10 carried by the person, and therefore the notification unit 23, which will be described later, is able to notify the terminal 10 of changes that occur in the shopping list.

Moreover, in the case where the self-checkout system 1 does not include the person identification device 50 (that is, in the case where the terminal 10 is not associated with the shopping list), the shopping list generation unit 21 may generate a shopping list when the first relationship generation unit 140 has generated person-and-product relationship information. In this case, the shopping list generation unit 21 may also integrate the shopping lists when the relationship integration unit 150 has integrated the relationship information. In this manner, the shopping list is managed in association with each person.

Receiving the integrated relationship information from the relationship integration unit 150, the shopping list updating unit 22 updates the contents of the shopping list on the basis of relationship information integrated by the relationship integration unit 150. Specifically, the shopping list updating unit 22 updates the contents of the shopping list corresponding to each person on the basis of the classification of the change in the product shelf included in the relationship information and of the shelving information on the product shelf.

In this exemplary embodiment, the relationship information includes the position information of the area of change in the product shelf and the classification of the change in the product shelf. Therefore, the shopping list updating unit 22 specifies the product whose change in the display state is detected, on the basis of the shelving information on the product shelf on which the product has been arranged.

The shopping list updating unit 22 may receive only the relationship information integrated anew (in other words, difference information) by the relationship integration unit 150 or may receive all of the integrated relationship information. In the case of having received the difference information, the shopping list updating unit 22 performs an updating process for the products included in the difference information with respect to the shopping list that has been already generated. Moreover, in the case of having received all of the integrated relationship information, the shopping list updating unit 22 updates all of the shopping lists of the person on the basis of the received relationship information.

The shelving information indicates the arrangement position of a product prepared in advance for a product shelf of each store. The shelving information is, for example, information in which a product shelf number (row) and a column number are linked with the name of a product arranged at the position of the numbers. Further, the position where the imaging device 2 captures an image is previously linked with the position of the product shelf for management. Therefore, the product is able to be specified by linking the product shelf area of the image captured by the imaging device 2 with the shelving information.

Figure 10:
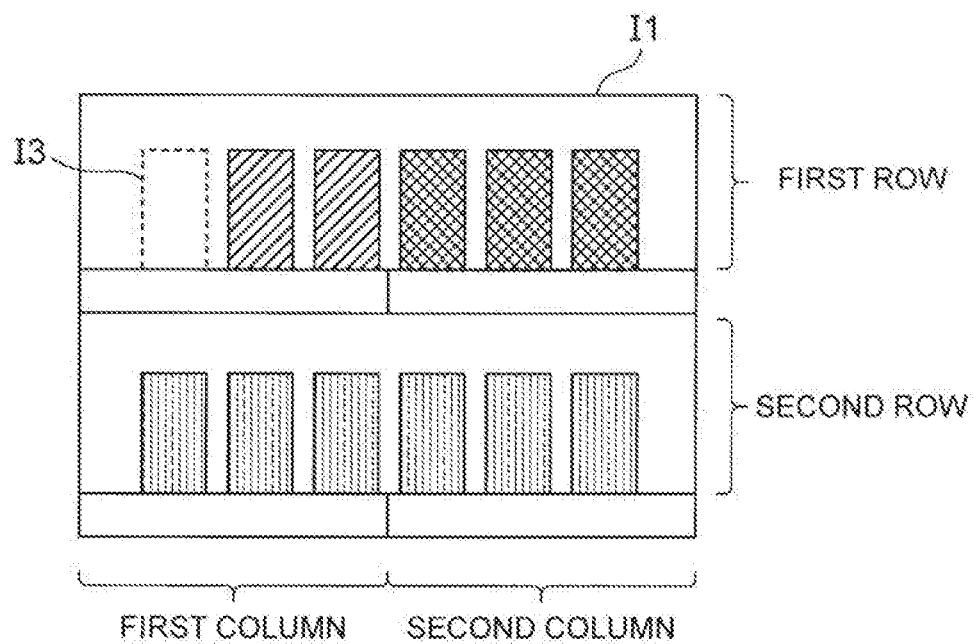
FIG. 10 It depicts an explanatory diagram illustrating an example of shelving information.

FIG. 10 is an explanatory diagram illustrating an example of the shelving information. In the example illustrated in FIG. 10, it is assumed that an image I1 is captured by a camera with the camera ID of 1, which is an imaging device. Shelving information I2 illustrated in FIG. 10 represents products arranged in the range specified by a row and a column of the product shelf. For example, it is assumed that the position information of a product I3 included in the image I1 matches position information in the first row of the relationship information illustrated in FIG. 8 (specifically, position information (10, 0, 30, 50)). In this case, the shopping list updating unit 22 specifies the product I3 as a product a linked with the first column of the first row of the shelving information I2.

Furthermore, as described above, the relationship information includes a classification result of the area of change in the product shelf. In other words, the classification of the change in the product shelf can be specified from the relationship information. Therefore, the shopping list updating unit 22 specifies a product whose change is classified as a change in the product shelf that is a result of a person having picked up the product, on the basis of the shelving information on the product shelf on which the product has been arranged. Then, the shopping list updating unit 22 performs a registration process for registering the specified product on the shopping list that corresponds to the person. In the above example, the change in the product shelf caused by the person having picked up the product corresponds to "a change caused by a product having been taken" and the type of change corresponds to "a product decrease."

The shopping list updating unit 22 performs a process of registering a product on a shopping list corresponding to a person as a registration process for registering the product on the shopping list. Moreover, the shopping list updating unit 22 may cause the notification unit 23 described later to notify the terminal 10 of information that the product has been registered as a registration process. At that time, the notification unit 23 may inquire the customer via the terminal 10 on whether a correct product has been added to the shopping list.

Furthermore, the shopping list updating unit 22 specifies the product whose change is classified as "a change in the product shelf that is a result of the person having returned the product" on the basis of the shelving information on the product shelf on which the product has been arranged. Then, the shopping list updating unit 22 performs a deletion process for deleting the specified product from the shopping list that corresponds to the person. The change in the product shelf that is a result of the person having returned the product corresponds to "a change caused by a product having been arranged on the product shelf" and the type of change corresponds to "a product increase."

The shopping list updating unit 22 performs a process of deleting the product from the shopping list corresponding to the person as a deletion process for deleting the product from the shopping list. Further, the shopping list updating unit 22 may cause the notification unit 23 described later to notify the terminal 10 of information that the product has been deleted as a deletion process. At that time, the notification unit 23 may inquire the customer via the terminal 10 on whether a correct product has been deleted from the shopping list.

Furthermore, instead of immediately deleting the product from the shopping list, the shopping list updating unit 22 may set a delete flag for identifying the product that has been returned to a different location than the location from which the product was taken to a target product included in the shopping list, as a deletion process. Then, the shopping list updating unit 22 may cause the notification unit 23, which will be described later, to notify the terminal 10 of information that the delete flag has been set. At that time, similarly, the notification unit 23 may inquire of the customer via the terminal 10 on whether or not the product with the delete flag set is a product to be deleted. Then, the shopping list updating unit 22 may receive an instruction indicating whether or not to delete the product with the delete flag set, via the terminal 10 carried by the notified person, and may delete the product from the shopping list in the case of receiving an instruction of deleting the product.

Moreover, the shopping list updating unit 22 may cause the notification unit 23 to send the shopping list to the terminal 10 with each updating the contents of the shopping list.

The notification unit 23 notifies the terminal 10 of the information on the shopping list. As described above, the notification unit 23 may notify the terminal 10 of the product registration and deletion and the setting of a delete flag, according to the process of the shopping list updating unit 22.

Furthermore, the notification unit 23 may notify the payment device 40, which will be described later, that a payment process will be stopped in the case where there is a product with a delete flag set in the shopping list. This notification prevents an unapproved product from being paid for.

The output device 30 outputs the contents of the shopping list. The output device 30 is installed, for example, near the payment device 40, which will be described later, and may output the contents of the shopping list at the time of the payment process. If the contents of the shopping list are able to be output to the terminal 10, the self-checkout system 1 does not need to include output device 30. The output device 30 may be, for example, a display device such as a display or may be a POS (point of sales) terminal. In addition, the output device 30 is not limited thereto, but may be, for example, a speaker or a mobile terminal.

The payment device 40 performs a payment process on the basis of the contents of the shopping list. For example, in the case where the shopping list is associated with the terminal 10, the payment device 40 may notify the terminal 10 associated with the shopping list of the total amount to perform the payment process. The method in which the payment device makes a payment via the personal terminal 10 is widely known, and therefore a detailed description is omitted here.

On the other hand, in the case where the shopping list is not associated with the terminal 10, the payment device 40 may cause the output device 30 to display the contents of the shopping list and the total amount to accept the payment process such as a deposit from a customer, a card payment, or the like. Since payment methods based on deposits and card payments are also widely known, a detailed description is omitted here.

In the case of receiving a notification that the payment process is stopped (specifically, a notification that a product with a delete flag set remains) from the notification unit 23 described above, the payment device 40 may stop the payment process based on the shopping list and display various alerts. The payment device 40 may notify, for example, the terminal 10 of a fact that the delete flag remains. Furthermore, the payment device 40 may prompt the customer for confirmation by displaying the product with the delete flag set on the output device 30 or audibly guiding the product with the output device 30.

The image processing device 100 (more specifically, the first acquisition unit 110, the first change detection unit 120, the first relationship generation unit 140, and the relationship integration unit 150) is implemented by the CPU of a computer that operates according to a program. For example, the program is stored in a storage unit (not illustrated) included in the image processing device 100, and the CPU may read the program to operate as the first acquisition unit 110, the first change detection unit 120, the first storage unit 130, the first relationship generation unit 140, and the relationship integration unit 150 according to the program.

Moreover, the first acquisition unit 110, the first change detection unit 120, the first storage unit 130, the first relationship generation unit 140, and the relationship integration unit 150 included in the image processing device 100 may be each implemented by dedicated hardware.

The shopping list management device 20 (more specifically, the shopping list generation unit 21, the shopping list updating unit 22, and the notification unit 23) is also implemented by the CPU of the computer that operates according to the program. For example, the program is stored in a storage unit (not illustrated) included in the shopping list management device 20, and the CPU may read the program to operate as the shopping list generation unit 21, the shopping list updating unit 22, and the notification unit 23 according to the program. The shopping list generation unit 21, the shopping list updating unit 22, and the notification unit 23 included in the shopping list management device 20 may be each implemented by dedicated hardware.

Figure 11:
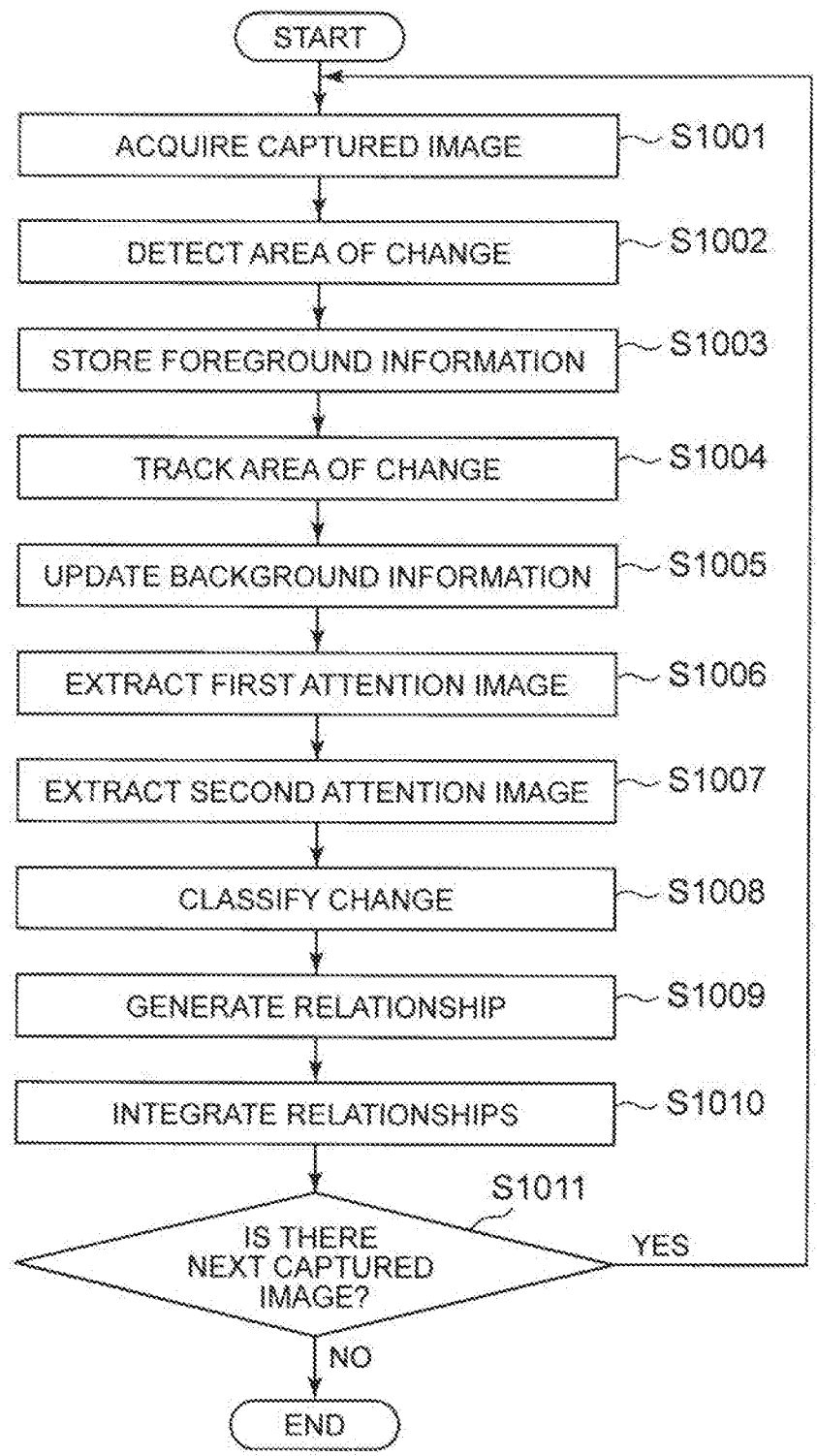
FIG. 11 It depicts a flowchart illustrating an example of operation of an image processing device 100 of a first exemplary embodiment.

Subsequently, the operation of the image processing device 100 of this exemplary embodiment will be described with reference to FIG. 11. FIG. 11 is a flowchart illustrating an example of operation of the image processing device 100 of this exemplary embodiment.

The first acquisition unit 110 acquires a captured image, which is an RGB image, from the video signal of the imaged product shelf 3 (step S1001). The first acquisition unit 110 supplies the captured image to the first change detection unit 120.

The foreground area detection unit 121 of the first change detection unit 120 uses the captured image, which is the RGB image supplied from the first acquisition unit 110, and the background information 131, which is the RGB image stored in the first storage unit 130, to detect the area changed between the two RGB images as an area of change (foreground area) (step S1002). Then, the foreground area detection unit 121 supplies the detection result of the area of change to the background information updating unit 122 and to the foreground area tracking unit 123. The foreground area detection unit 121 generates, for example, a binary image, in which the pixel value of the detected area of change is 255 and the pixel value of other areas is 0, and supplies the binary image to the background information updating unit 122 and to the foreground area tracking unit 123, as the detection result of the area of change.

The foreground area detection unit 121 stores the foreground information 133 in the first storage unit 130 (step S1003). As described above, the foreground information 133 is the detection result associated with the imaging time.

The foreground area tracking unit 123 tracks the area of change on the basis of the detection result supplied from the foreground area detection unit 121 and of the foreground information 133 (step S1004). The foreground area tracking unit 123 supplies the binary image representing the area of change that has been tracked for a predetermined time or longer to the first extraction unit 124 and to the second extraction unit 125. The foreground area tracking unit 123 supplies an update signal indicating an update of the background information 131 to the background information updating unit 122.

In the case where the moving distance of the area of change is equal to or more than a predetermined threshold as the tracking result, the foreground area tracking unit 123 determines that the object included in the area of change is a moving body and extracts the determined area of change as a person area. Thereafter, the foreground area tracking unit 123 associates the predetermined information with the person area and stores it as the person information 134 in the first storage unit.

The background information updating unit 122 updates the background information 131 on the basis of the captured image supplied from the first acquisition unit 110, the detection result of the area of change supplied from the foreground area detection unit 121, the background information 131, and the update signal supplied from the foreground area tracking unit 123 (step S1005). Note that step S1005 may be performed at an arbitrary timing after step S1004.

The first extraction unit 124 extracts, as a first attention image, the image of an area corresponding to the area of change (first attention area) indicated by the detection result in the captured image on the basis of the captured image supplied from the first acquisition unit 110 and the detection result related to the captured image supplied from the foreground area tracking unit 123 (step S1006). The first extraction unit 124 supplies the extracted first attention image to the area change classification unit 126.

The second extraction unit 125 extracts a second attention image from the background information 131 by a similar operation as the first extraction unit 124 on the basis of the detection result supplied from the foreground area tracking unit 123 and the background information 131 used to obtain the detection result, which has been acquired from the first storage unit 130 (step S1007). The second extraction unit 125 supplies the extracted second attention image to the area change classification unit 126. Note that step S1006 and step S1007 may be performed simultaneously or in reverse order.

The area change classification unit 126 classifies a change related to the product shelf 3 on the basis of the first attention image supplied from the first extraction unit 124, the second attention image supplied from the second extraction unit 125, and the shelf change model 132 stored in the first storage unit 130 (step S1008). Specifically, the change related to the product shelf 3 is a change from the state in the second attention image to the state in the first attention image.

The first relationship generation unit 140 receives the classification result of the area of change and the position information of the area of change from the area change classification unit 126 of the first change detection unit 120. Moreover, the first relationship generation unit 140 acquires the person information 134 from the first storage unit 130. Then, the first relationship generation unit 140 extracts a person who intersects with the area of change from the persons imaged at the time before the imaging time when the area of change was detected. Thereafter, the first relationship generation unit 140 associates the person, which has been imaged at the time closest to the imaging time of the area of change among the extracted persons, with the area of change (step S1009). Thereby, the first relationship generation unit 140 generates relationship information.

The relationship integration unit 150 receives the product-and-person relationship information from the first relationship generation unit 140, and if there is relationship information of the same person, the relationship integration unit 150 integrates the relationship information into one. The relationship integration unit 150 calculates the similarity on the basis of, for example, at least one of the color, dimensions, shape, and aspect ratio of the circumscribing rectangle of the person area stored in the person information 134 in the first storage unit 130. Then, the relationship integration unit 150 determines that the person areas with the highest calculated similarity are of the same person. Thereafter, the relationship integration unit 150 integrates the relationship information including the persons determined to be the same person into one (step S1010).

The image processing device 100 determines whether the first acquisition unit 110 has received the next video signal (whether there is the next captured image) (step S1011). If there is the next captured image (YES in step S1011), the process proceeds to step S1001. On the other hand, if there is no next captured image (NO in step S1011), the image processing device 100 ends the operation.

Figure 12:
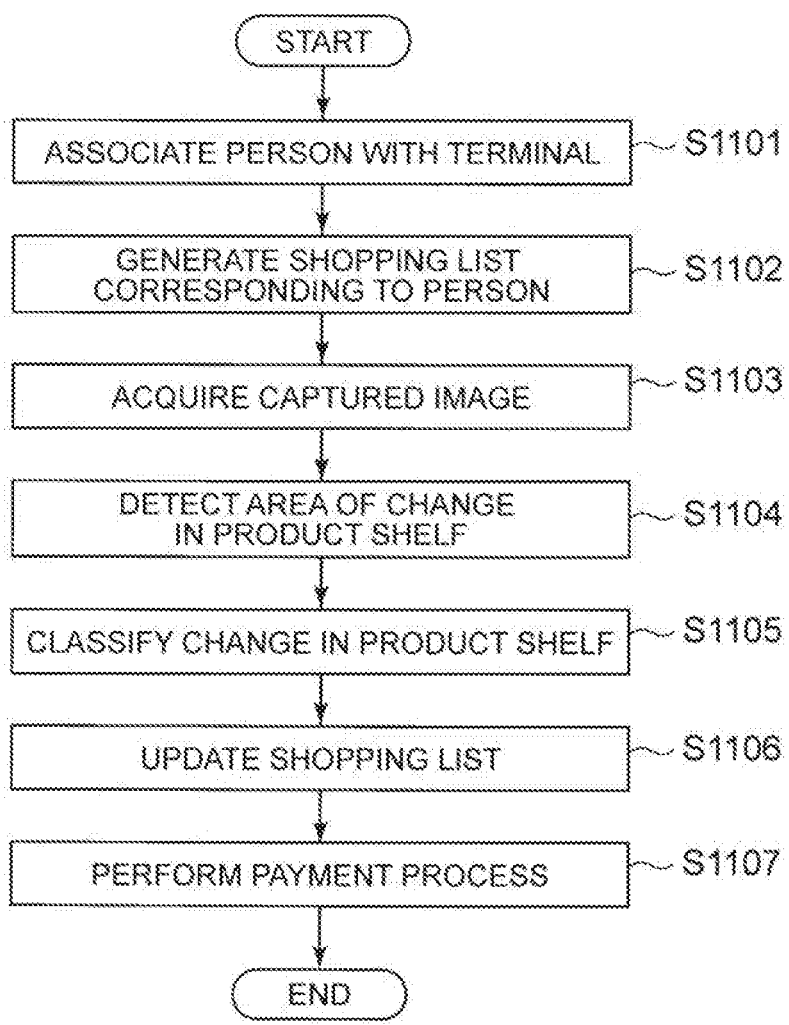
FIG. 12 It depicts a flowchart illustrating an example of operation of a self-checkout system of the first exemplary embodiment.

Subsequently, the operation of the self-checkout system 1 of this exemplary embodiment will be described with reference to FIG. 12. FIG. 12 is a flowchart illustrating an example of operation of the self-checkout system 1 of the first exemplary embodiment. First, when a customer (person) visits the store, the person identification device 50 identifies the person and associates the person with the terminal 10 (step S1101). Moreover, the shopping list generation unit 21 generates a shopping list that corresponds to the person (step S1102). After the customer enters the store, the imaging device 2 acquires a captured image (step S1103). The image processing device 100 detects the area of change in the product shelf on the basis of the captured image (step S1104). Then, the image processing device 100 classifies the change in the product shelf in the detected area of change (step S1105). The image processing device 100 updates the shopping list corresponding to the person on the basis of the classification of the change in the product shelf and of the shelving information on the product shelf (step S1106).

Thereafter, the payment device 40 performs the payment process on the basis of the contents of the shopping list (step S1107).

As described above, in this exemplary embodiment, the first change detection unit 120 (more specifically, the foreground area detection unit 121) detects the area of change in the product shelf from the video of the captured product shelf. Further, the first change detection unit 120 (more specifically, the area change classification unit 126) classifies the change in the product shelf in the detected area of change. Then, the shopping list updating unit 22 generates the shopping list for the customer on the basis of the classification of the change in the product shelf and of the shelving information on the product shelf. Therefore, products purchased by customers can be properly managed without preparing images of individual products in advance.

Moreover, for example, in a generally known background difference method, it is only necessary to define information not to be detected on the background in order to detect other information, by which it is unnecessary to collect reference images of physical objects in advance. There are, however, a plurality of changes in the product shelf detected as image differences. Therefore, in the case where only the general background difference method is used, changes in the product shelf cannot be accurately recognized.

For example, all of the changes caused by that "the product was taken," "the product has been arranged (added)," "the appearance or position has changed" after the product was picked up once and then returned, "the illumination has changed," and the like are detected as changes in the product shelf. A change, however, caused by that "the product was taken" indicates that the products on the product shelf have decreased, and a change caused by that "the product has been arranged (added)" indicates that the products on the product shelf have increased. In addition, changes caused by that "the appearance or position has changed" or "the illumination has changed" do not indicate that the products on the product shelf have increased or decreased.

Therefore, the type of change in the product shelf detected as an image difference cannot be specified only by using the general technique, which leads to a problem that the display state of products cannot be accurately grasped.

In this exemplary embodiment, however, the area change classification unit 126 classifies the change in the product shelf in the detected area of change. Specifically, the area change classification unit 126 uses the shelf change model 132, which is a model of a change in the product shelf 3 depending on before and after a time change, to classify the change in the product shelf from the images of the area of change. This shelf change model 132 enables classification of changes into: a change caused by a product having been taken; a change in a store environment of the product shelf; a change caused by a product having been arranged on the product shelf; a change caused by a different appearance of the product; and the like. As a result, the image processing device 100 is able to more accurately determine the state of the product shelf 3 such as whether the product has been taken or the product shelf 3 has been refilled.

Furthermore, the image processing device 100 of this exemplary embodiment is able to detect that a product has been returned to a different location than the location from which the product was taken, as described above. For example, if a product has been returned to a different location than the location from which the product was taken, such as in a case where a refrigerated product is returned to a shelf at room temperature, a sales opportunity loss or a product disposal loss occurs, which greatly affects store sales. Therefore, when such a situation occurs, it is preferable to promptly perform a product management work to eliminate the situation. The use of the image processing device 100 of this exemplary embodiment enables a reduction in the occurrence of the sales opportunity loss and the product disposal loss caused by products being returned to different locations than the locations from which the products were taken.

In this exemplary embodiment, there has been described a case where the imaging device 2 images the product shelf 3. The target to be imaged by the imaging device 2, however, is not limited to the product shelf 3. The imaging device 2 may image, for example, products stacked on a wagon. Specifically, the captured image captured by the imaging device 2 may be a captured image of products stacked on a wagon. The image processing device 100 may detect the area of change by comparing the captured image of the products stacked on the wagon with the background image. As described above, the image processing device 100 is able to use the captured image of products displayed in various display methods, without limiting the captured image to an image of products displayed on the product shelf so that all faces of the products can be seen.

Exemplary Embodiment 2

Subsequently, a second exemplary embodiment of the present invention will be described. In the second exemplary embodiment, description will be made on a self-checkout system 1 that monitors product shelves 3 by acquiring different types of images with a plurality of imaging devices 2. In this exemplary embodiment, description will be made on a case where a plurality of imaging devices 2 acquire RGB images and range images. The imaging devices 2 may be, for example, an RGB camera that acquires an RGB image and a depth camera that acquires a range image.

In this case, the RGB camera and the depth camera are placed in positions close to each other to image the same target (product shelf 3). In addition, the RGB camera and the depth camera are time-synchronized with each other, and it is preferable to image the product shelf 3 at approximately the same time. In other words, the depth camera is preferably a camera that outputs a range image of the imaging range of the RGB image within a predetermined time from the time at which the RGB image is captured by the RGB camera. The imaging device 2 may also be a sensor that is able to acquire multiple types of images (for example, an RGB image and a range image). The imaging device 2 may be, for example, an RGBD camera.

The image processing device 200 in this exemplary embodiment is communicatively connected to a terminal 10, an imaging device 2, a shopping list management device 20, an output device 30, a payment device 40, and a person identification device 50, similarly to the image processing device 100 illustrated in FIG. 1 and described in the first exemplary embodiment. The terminal 10, the shopping list management device 20, the output device 30, the payment device 40, and the person identification device 50 of this exemplary embodiment are the same as those of the first exemplary embodiment.

Figure 13:
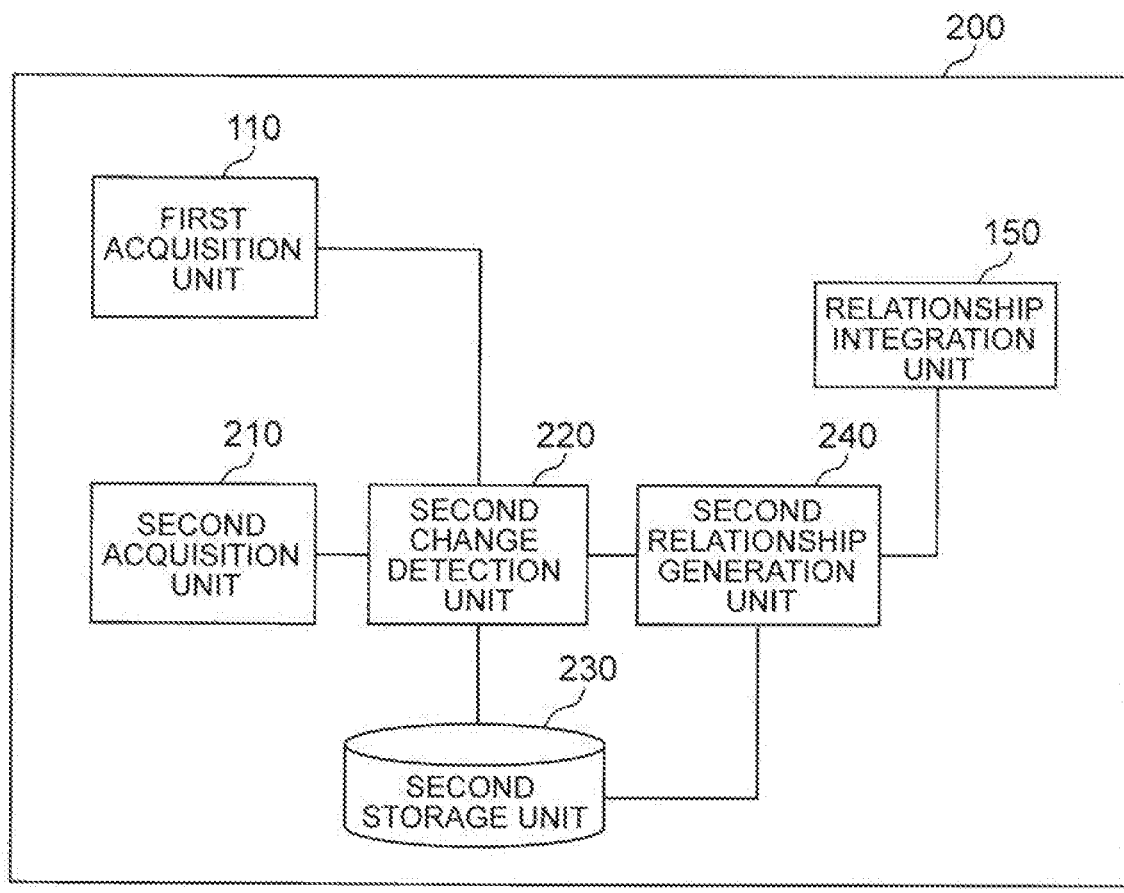
FIG. 13 It depicts an explanatory diagram illustrating a configuration example of an image processing device 200.

FIG. 13 is an explanatory diagram illustrating a configuration example of the image processing device 200. The image processing device 200 of this exemplary embodiment includes a first acquisition unit 110, a second acquisition unit 210, a second change detection unit 220, a second storage unit 230, a second relationship generation unit 240, and a relationship integration unit 150. As described above, the image processing device 200 includes the second acquisition unit 210 in addition to the configuration of the image processing device 100. Moreover, the image processing device 200 includes the second change detection unit 220, the second storage unit 230, and the second relationship generation unit 240, instead of the first change detection unit 120, the first storage unit 130, and the first relationship generation unit 140 of the image processing device 100.

In the above, the same reference numerals are given to the elements having the same functions as the elements included in the drawings described in the first exemplary embodiment described above. The characteristic configuration of this exemplary embodiment will be described below.

Figure 14:
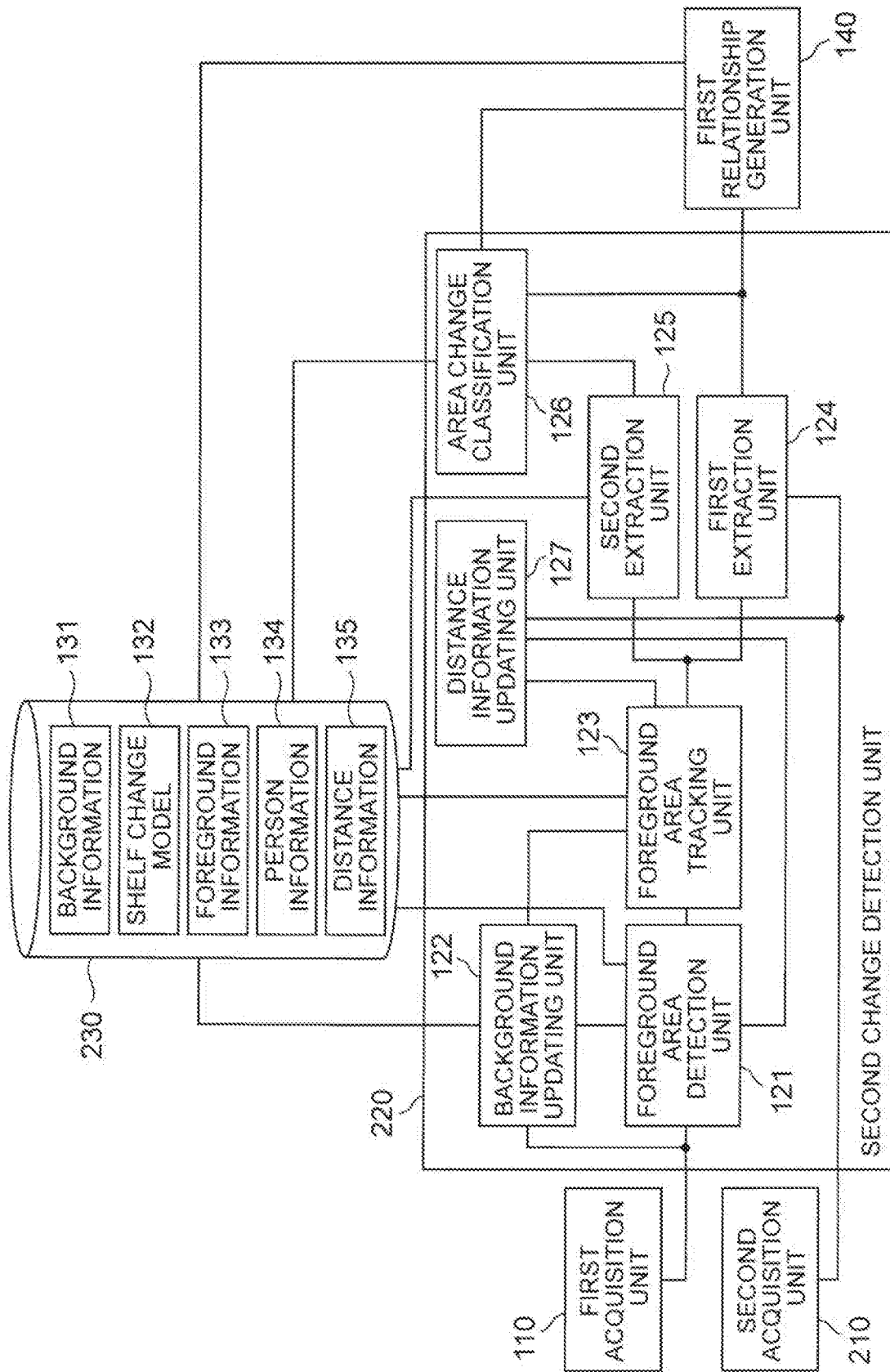
FIG. 14 It depicts block diagram illustrating a configuration example of a second change detection unit and a second storage unit.

FIG. 14 is block diagram illustrating a configuration example of the second change detection unit 220 and the second storage unit 230. As illustrated in FIG. 14, the second change detection unit 220 includes a foreground area detection unit 121, a background information updating unit 122, a foreground area tracking unit 123, a first extraction unit 124, a second extraction unit 125, an area change classification unit 126, and a distance information updating unit 127. In addition, the second storage unit 230 stores background information 131, a shelf change model 132, foreground information 133, person information 134, and distance information 135.

The first acquisition unit 110 acquires a captured image that is an RGB image, similarly to the first exemplary embodiment. Hereinafter, the captured image, which is the RGB image acquired by the first acquisition unit 110, is referred to as "first captured image."

Similarly to the first acquisition unit 110, the second acquisition unit 210 receives a video signal indicating the captured image obtained by the imaging device 2 by imaging the product shelf 3 and acquires a range image from the video signal. The second acquisition unit 210 receives a video signal of a different type from the type of the video signal acquired by the first acquisition unit 110. For example, in the case where the video signal acquired by the first acquisition unit 110 is a video signal representing an RGB image, the second acquisition unit 210 acquires a video signal representing a range image. Note that the term "range image" may mean, for example, an image with a value of the distance from the imaging device 2 to the physical object. Moreover, each pixel in the range image may be represented by a value of 0 to 255, for example. At this time, the value of each pixel (in other words, a distance value) may be close to 0 if the physical object is close to, for example, the imaging device 2, and may be close to 255 if the physical object is far from the imaging device 2. The value of each pixel in the range image is not limited thereto. In this exemplary embodiment, description will be made assuming that the captured image acquired by the second acquisition unit 210 is a grayscale range image.

Similarly to the first acquisition unit 110, the second acquisition unit 210 may acquire a video signal converted on the basis of the captured image stored inside the imaging device 2 or stored in a storage device different from the imaging device 2 and the image processing device 100. Further, in the case where the image processing device 100 is built in the imaging device 2, the second acquisition unit 210 may acquire the captured image itself.

The second acquisition unit 210 converts the acquired video signal to a range image representing the video signal and supplies the range image to the first extraction unit 124, the second extraction unit 125, and the distance information updating unit 127. The range image obtained by converting the video signal with the second acquisition unit 210 or the captured image acquired from the imaging device 2 will be hereinafter referred to as "second captured image."

The first acquisition unit 110 and the second acquisition unit 210 may be integrally formed. The first captured image and the second captured image are associated with each other on the basis of information indicating the imaging position and the imaging time.

The second storage unit 230 of this exemplary embodiment stores the distance information 135. The distance information 135 will be described later.

The first extraction unit 124 extracts the image of the area of change from the second captured image. Specifically, the first extraction unit 124 uses the second captured image, which is the range image supplied from the second acquisition unit 210, and the binary image, which is the detection result supplied from the foreground area detection unit 121, to extract the image of the area in the second captured image corresponding to the area with a pixel value of 255 in the binary image as a first attention image. The first extraction unit 124 may extract the first attention image in the same manner as in the first exemplary embodiment. Then, the first extraction unit 124 supplies the extracted first attention image to the area change classification unit 126.

The second extraction unit 125 extracts the image of the area of change from a range image obtained before the imaging time of the range image, which is the second captured image associated with the first captured image used by the foreground area detection unit 121 to generate the binary image. Specifically, the second extraction unit 125 receives the binary image, which is a detection result, from the foreground area detection unit 121. The second extraction unit 125 acquires distance information 135, which is the second captured image captured before the imaging time of the first captured image used to generate the binary image, from the second storage unit 230. The distance information 135 is the second captured image updated by the second acquisition unit 210, which will be described later, and is the range image acquired by the second acquisition unit 210. The distance information 135 is associated with the imaging time. Since the first captured image and the second captured image are time-synchronized with each other as described above, the imaging time of the first captured image and the imaging time of the second captured image, which is associated with the first captured image, are almost the same. Therefore, it can be said that the second extraction unit 125 extracts the image of the area of change as a second attention image, from the (past) second captured image captured before the second captured image for which the first extraction unit 124 performs the extraction process.

Note that the second extraction unit 125 extracts the second attention image in the same method as the method in which the first extraction unit 124 extracts the first attention image. The second extraction unit 125 supplies the extracted second attention image to the area change classification unit 126.

The distance information updating unit 127 updates the distance information 135 on the basis of the range image supplied from the second acquisition unit 210 and the distance information 135 stored in the second storage unit 230. The distance information updating unit 127 may update the distance information 135, for example, by the same operation as the operation of the background information updating unit 122.

The area change classification unit 126 classifies the change related to the product shelf 3 in the area of change on the basis of the distance information 135 in the area of change. First, the area change classification unit 126 receives the first attention image from the first extraction unit 124. Moreover, the area change classification unit 126 receives the second attention image from the second extraction unit 125. The area change classification unit 126 classifies the change related to the product shelf 3 in the area of change on the basis of the first attention image and the second attention image.

The area change classification unit 126 may classify the change, for example, on the basis of a calculation result obtained by subtracting the value (distance value) of each pixel in the second attention image from the value (distance value) of each pixel in the first attention image. For example, in the case where the calculation result is a value equal to or more than a first predetermined threshold, in other words, in the case where the physical object included in the first attention image is deeper than the physical object included in the second attention image, the area change classification unit 126 may classify the change related to the product shelf 3 in the area of change as "a change caused by that a product is no longer contained in the product shelf 3" ("a change caused by a product having been taken"). Further, for example, in the case where the calculation result is a value equal to or less than a second predetermined threshold, in other words, in the case where the physical object included in the first attention image is closer to the imaging device 2 than the physical object included in the second attention image is, the area change classification unit 126 may classify the change related to the product shelf 3 in the area of change as "a change caused by that a product is contained anew in the product shelf 3." In addition, in other cases, the area change classification unit 126 may classify the change related to the product shelf 3 in the area of change as "a change caused by a different appearance of a product displayed on the product shelf 3" or "a change caused by a change in illumination."

In addition, the area change classification unit 126 may, for example, cluster the distance value of each pixel in the first attention image and the distance value of each pixel in the second attention image to define the distance value of the class with the largest number of elements as a distance value that represents each attention image and further may obtain the coordinates of the cluster of the class of each attention image. Then, for example, in the case where the absolute value of the difference between the distance values representing the respective attention images is within a third predetermined threshold and the difference between the coordinates of the clusters of the classes of the respective attention images is equal to or more than a fourth predetermined threshold, the area change classification unit 126 may classify the change related to the product shelf 3 in the area of change as "a change caused by a different appearance of a product displayed on the product shelf 3."

Further, the area change classification unit 126 may use, for example, a result of subtracting the distance value representing the first attention image from the previously-set value of a distance from the imaging device 2 to the product shelf 3 to classify the change related to the product shelf 3 in the area of change as a type related to a change in a product displayed on the product shelf 3 or a type related to a change caused by an object other than the product displayed on the product shelf 3. For example, if the above result is a positive value, in other words, if the physical object included in the image of the area of change in the captured image is present between the imaging device 2 and the product shelf 3, then the area change classification unit 126 may classify the change related to the product shelf 3 in that area of change as the type related to "a change caused by an object other than a product displayed on the product shelf 3." The type related to "a change caused by an object other than a product displayed on the product shelf 3" is at least one of, for example, "a change caused by the presence of a person in front of the product shelf 3," "a change caused by the presence of a shopping cart in front of the product shelf 3," and "a change caused by the presence of a person and a shopping basket in front of the product shelf 3." Moreover, if the above result is not a positive value, the area change classification unit 126 may classify the change related to the product shelf 3 in that area of change as the type related to "a change in a product displayed on the product shelf 3." In this manner, the area change classification unit 126 is able to reduce the processing cost of the classification process by performing the classification process by using the first attention image and the preset distance values.

The image processing device 200 (more specifically, the first acquisition unit 110, the second acquisition unit 210, the second change detection unit 220, the second relationship generation unit 240, and the relationship integration unit 150) is implemented by the CPU of a computer that operates according to a program.

The above is an example of a characteristic configuration of the image processing device 200.

Figure 15:
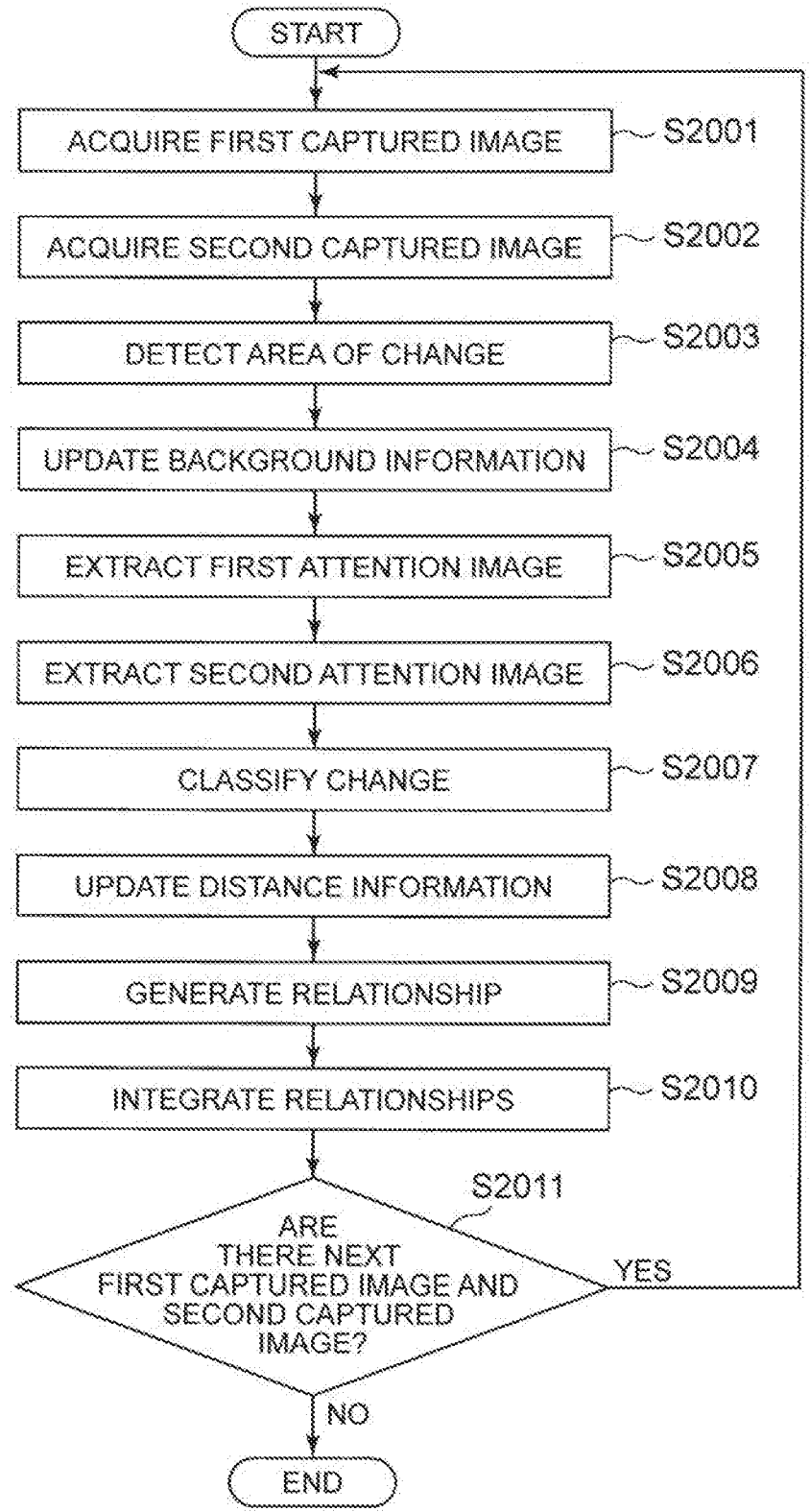
FIG. 15 It depicts a flowchart illustrating an example of operation of an image processing device 200 of a second exemplary embodiment.

Subsequently, the operation of the image processing device 200 of this exemplary embodiment will be described with reference to FIG. 15. FIG. 15 is a flowchart illustrating an example of operation of the image processing device 200 of this exemplary embodiment.

The first acquisition unit 110 acquires the first captured image, which is an RGB image, from the video signal obtained by imaging the product shelf 3 (step S2001). The second acquisition unit 210 acquires the second captured image, which is a range image, from the video signal obtained by imaging the product shelf 3 (step S2002). The imaging time of the second captured image is within a predetermined time from the time at which the first captured image is captured, and the imaging range of the second captured image has only to be the imaging range of the first captured image. The timing at which the second acquisition unit 210 acquires the second captured image has only to be before step S2005.

The foreground area detection unit 121 detects the area of change (step S2003), and the background information updating unit 122 updates the background information 131 (step S2004). The first extraction unit 124 extracts an image of the area (first attention area) corresponding to the area of change indicated by the detection result in the second captured image, as a first attention image, on the basis of the second captured image supplied from the second acquisition unit 210 and of the detection result supplied from the foreground area detection unit 121 (step S2005). The first extraction unit 124 supplies the extracted first attention image to the area change classification unit 126.

The second extraction unit 125 extracts the second attention image from the distance information 135 by the same operation as the operation of the first extraction unit 124, on the basis of the detection result supplied from the foreground area detection unit 121 and of the distance information 135 indicating the second captured image captured before the imaging time of the second captured image supplied to the first extraction unit 124, which has been acquired from the second storage unit 230 (step S2006). The second extraction unit 125 supplies the extracted second attention image to the area change classification unit 126. Note that step S2005 and step S2006 may be performed simultaneously or in reverse order. Then, the area change classification unit 126 classifies the change related to the product shelf 3 in the area of change on the basis of a result of comparison between the value of each pixel in the first attention image and the value of each pixel in the second attention image (step S2007). The distance information updating unit 127 updates the distance information 135 on the basis of the second captured image supplied from the second acquisition unit 210 and of the distance information 135 (step S2008).

Hereinafter, the image processing device 200 performs the same processes as the processes of steps S1009 to S1010 illustrated in FIG. 11, by which the second relationship generation unit 240 generates the relationship (step S2009) and the relationship integration unit 150 integrates relationship information (step S2010).

The image processing device 200 determines whether the first acquisition unit 110 and the second acquisition unit 210 have received the next video signals (whether there are the next captured images) (step S2011). If the next captured images are present (YES in step S2011), the process proceeds to step S2001. On the other hand, unless the next captured images are present (NO in step S2011), the image processing device 200 ends the operation.

As described above, in the exemplary embodiment, the foreground area detection unit 121 detects the area of change in the product shelf on which the product has been arranged, on the basis of the RGB image and of the range image, which has been obtained by imaging the imaging range of the RGB image, as the captured images of the product. Therefore, the change in the product shelf can be determined more accurately, thereby enabling products purchased by customers to be managed more properly.

Exemplary Embodiment 3

Subsequently, a third exemplary embodiment of the present invention will be described. In the third exemplary embodiment, description will be made on the configuration of the image processing device 100 described in the first exemplary embodiment and further made on an image processing device 300 having a configuration for generating a flow line data of a customer. As will be described later, the image processing device 300 uses the generated flow line data to generate relationship information. Thus, the flow line data of customers can be acquired more accurately, thereby enabling products purchased by customers to be managed properly.

Figure 16:
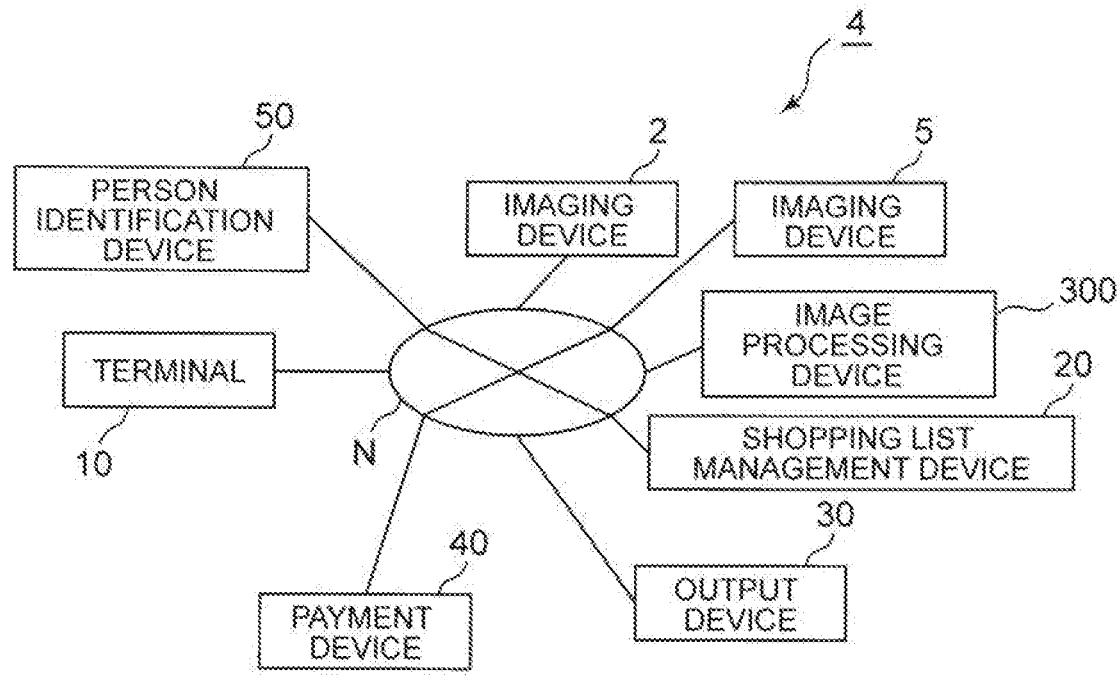
FIG. 16 It depicts an explanatory diagram illustrating a configuration example of a third exemplary embodiment of a self-checkout system according to the present invention.

FIG. 16 is an explanatory diagram illustrating a configuration example of the third exemplary embodiment of the self-checkout system according to the present invention. A self-checkout system 4 of this exemplary embodiment includes an imaging device 5 that images an aisle in a store similarly to a general security camera, in addition to the imaging device 2 that images a product shelf 3. Furthermore, similarly to the imaging device 2, the imaging device 5 is communicatively connected to a terminal 10, a shopping list management device 20, an output device 30, a payment device 40, a person identification device 50, and an image processing device 300 via a network N. The terminal 10, the imaging device 2, the shopping list management device 20, the output device 30, the payment device 40, and the person identification device 50 of this exemplary embodiment are the same as those of the first exemplary embodiment.

The imaging device 5 is a security camera installed in, for example, a store or the like. The imaging device 5 is installed at a position, for example, where each aisle in the store can be imaged. The configuration of the imaging device 5 may be the same as the configuration of the imaging device 2.

The self-checkout system 4 may have one imaging device 5 or a plurality of imaging devices 5. In other words, the self-checkout system 4 may image each aisle in the store with one imaging device 5, or may image respective aisles in the store with a plurality of imaging devices 5. In this exemplary embodiment, description will be made on a case where the self-checkout system 4 has an imaging device 2 and another imaging device 5. The self-checkout system 4, however, may acquire flow line data of a customer on the basis of captured images captured by a plurality of imaging devices 2. Specifically, the self-checkout system 4 may acquire the flow line data of the customer on the basis of the captured images of the product shelves 3 captured by the plurality of imaging devices 2.

The image processing device 300 generates flow line data indicating a customer's moving path in the store from the RGB image captured by the imaging device 5. Then, the image processing device 300 generates product-and-person relationship information on the basis of the generated flow line data and the area of change of the product shelf 3.

Figure 17:
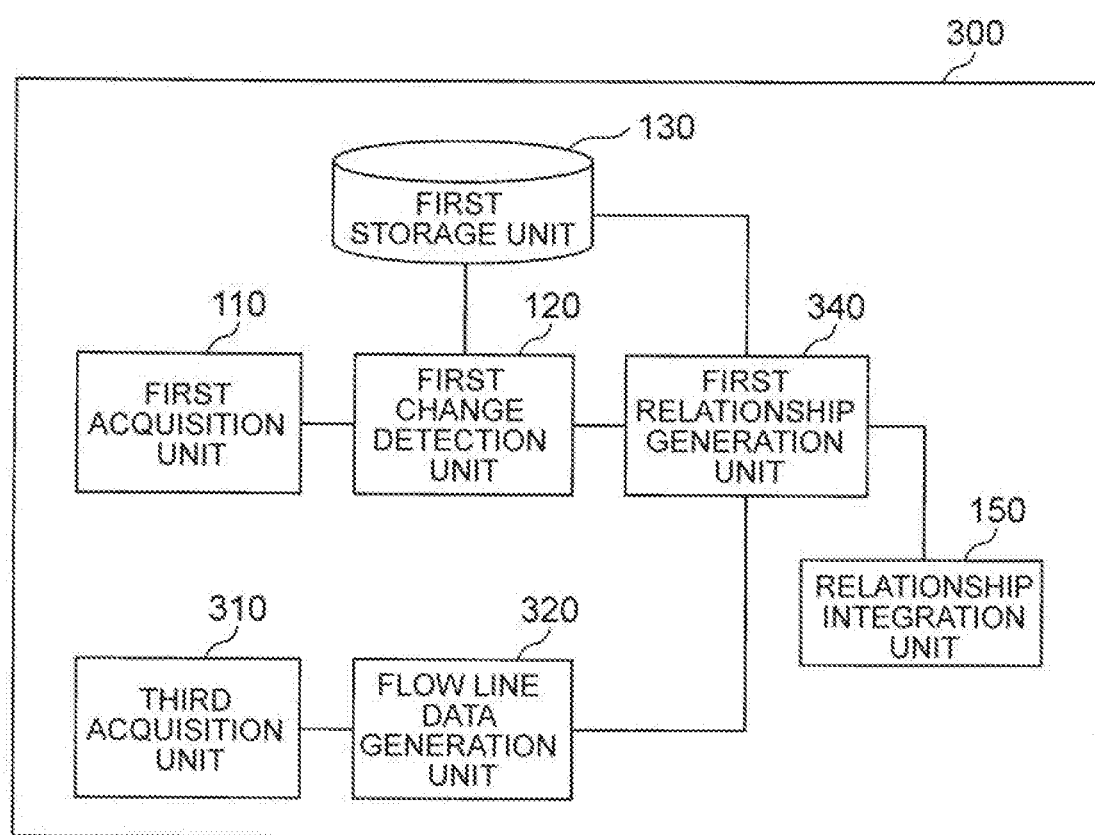
FIG. 17 It depicts an explanatory diagram illustrating a configuration example of an image processing device 300.

FIG. 17 is a block diagram illustrating a configuration example of the image processing device 300. As illustrated in FIG. 17, the image processing device 300 of this exemplary embodiment includes a first acquisition unit 110, a first change detection unit 120, a first storage unit. 130, a first relationship generation unit 340, a third acquisition unit 310, a flow line data generation unit 320, and a relationship integration unit 150. In this manner, the image processing device 300 of this exemplary embodiment includes the first relationship generation unit 340, instead of the first relationship generation unit 140 of the image processing device 100. Furthermore, the image processing device 300 includes the third acquisition unit 310 and the flow line data generation unit 320 in addition to the configuration of the image processing device 100.

In the above, the same reference numerals are given to the elements having the same functions as the elements included in the drawings described in the first exemplary embodiment and the second exemplary embodiment described above. The characteristic configuration of this exemplary embodiment will be described below.

The third acquisition unit 310 acquires an RGB image from the imaging device and supplies the RGB image to the flow line data generation unit 320 by the same operation as in the first acquisition unit 110. The RGB image acquired by the third acquisition unit 310 is an image of an aisle in the store, similarly to a general security camera.

The flow line data generation unit 320 uses the RGB image captured by at least one imaging device 5 to generate flow line data of a person in the store. The flow line data generated by the flow line data generation unit 320 is information including, for example, a person ID used to identify a customer, and the product shelf ID, which is an identifier of the product shelf 3 that the customer visited. The method in which the flow line data generation unit 320 generates flow line data is not particularly limited. The flow line data generation unit 320 may generate flow line data by using, for example, the method described in PTL 2. In other words, the flow line data generation unit 320 performs face recognition of persons to detect persons, from which the same data is acquired, as the same person or extracts information indicating the characteristics of customers such as clothes to detect the same person in order to identify the customers in the captured image. Furthermore, the flow line data generation unit 320 determines that the customer has visited the product shelf 3 by using criteria such that the customer stays in front of the product shelf 3 for a certain period of time, that a distance between the customer and the product shelf 3 is equal to or less than a predetermined distance, or the like. Then, the flow line data generation unit 320 generates flow line data by linking the person ID for identifying the customer with the product shelf ID of the product shelf visited by the customer. Note that the flow line data generation unit 320 may generate flow line data by using a method other than those exemplified above.

FIG. 18 is an explanatory diagram illustrating an example of flow line data generated by the flow line data generation unit 320. The flow line data illustrated in FIG. 18 includes a person ID that indicates a person, a product shelf ID indicating the product shelf visited by the person, and a camera ID indicating the imaging device that is imaging the product shelf. The example in FIG. 18 illustrates that three persons visited a product shelf A and that a person with a person ID of 1 and a person with a person ID of 2 visited the product shelf A twice. Although the time when a person visited the product shelf is not specified in the example illustrated in FIG. 18, the flow line data may include the time when each product shelf was visited. The example in FIG. 18 illustrates that product shelf A is visited in order from the top row and from the oldest.

The flow line data generation unit 320 generates flow line data as illustrated in FIG. 18, for example. Then, the flow line data generation unit 320 associates the generated flow line data with the time of the captured image of the flow line data and supplies them to the first relationship generation unit 340. In other words, the flow line data generation unit 320 supplies the first relationship generation unit 340 with the time when each person in the flow line data visited each product shelf included in the flow line data.

The first relationship generation unit 340 receives the classification result of an area of change and the position information of the area of change from the first change detection unit 120. Further, the first relationship generation unit 340 acquires flow line data from the flow line data generation unit 320. Then, the first relationship generation unit 340 generates product-and-person relationship information corresponding to the area of change on the basis of the imaging time of the area of change tied to the position information of the area of change and the imaging time tied to the flow line data. Thereafter, the first relationship generation unit 340 supplies the generated product-and-person relationship information to the relationship integration unit 150.

Specifically, the first relationship generation unit 340 associates the area of change with a person who visited the product shelf at the time closest to the imaging time of the area of change from the flow line data generated at the time before the imaging time when the area of change was detected.

FIG. 19 is an explanatory diagram illustrating an example of product-and-person relationship information generated by the first relationship generation unit 340. FIG. 19 illustrates the camera ID that indicates an ID of an imaging device, the person ID that indicates a person imaged by the imaging device, the product shelf ID that indicates a product shelf, the position information of the area of change of that product shelf, and a classification result of the change.

As described above, the first relationship generation unit 340 generates relationship information by using flow line data, instead of the person information 134. Note that the first relationship generation unit 340 may also use the person information 134 when generating relationship information.

The relationship integration unit 150 receives the relationship between the product and person from the first relationship generation unit 340, and if there are relationships of the same person, the relationship integration unit 150 integrates the relationships into one. Then, the relationship integration unit 150 supplies the integrated relationship to the shopping list management device 20.

Specifically, the relationship integration unit 150 integrates the relationships of the same person on the basis of the person ID. FIG. 20 is an explanatory diagram illustrating an example that the product-and-person relationships illustrated in FIG. 19 are integrated. In the example illustrated in FIG. 20, the pieces of relationship information of a person with the person ID of 1 in FIG. 19 are integrated into one, and the pieces of relationship information of a person with the person ID of 2 are also integrated into one.

The above is an example of a characteristic configuration of the image processing device 300.

Figure 21:
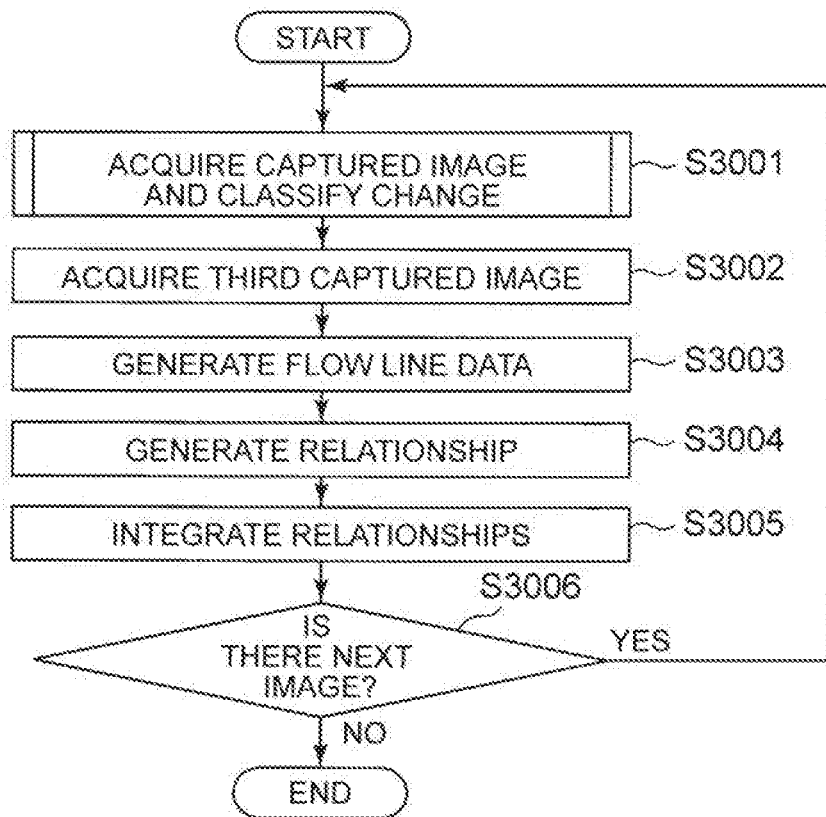
FIG. 21 It depicts a flowchart illustrating an example of operation of an image processing device 300 of a third exemplary embodiment FIG. 22 It depicts block diagram illustrating a modification of a self-checkout system of the third exemplary embodiment.

Subsequently, with reference to FIG. 21, the operation of the image processing device 300 of this exemplary embodiment will be described. FIG. 21 is a flowchart illustrating an example of operation of the image processing device 300 of this exemplary embodiment.

Referring to FIG. 21, the image processing device 300 performs the same processes as steps S1001 to S1008 illustrated in FIG. 11, whereby the area change classification unit 126 classifies the change (step S3001).

The third acquisition unit 310 acquires a captured image (third captured image), which is an RGB image, from a video signal sent from the imaging device 5 that has imaged an aisle in the store (step S3002). The third acquisition unit 310 supplies the captured image, which has been acquired, to the flow line data generation unit 320.

The flow line data generation unit 320 generates flow line data of a person in the store by using an RGB image captured by at least one imaging device (step S3003). Then, the flow line data generation unit 320 associates the generated flow line data with the time of the captured image of the flow line data and supplies them to the first relationship generation unit 340.

Note that the order of performing processes of steps S3002 and S3003 may be interchanged with the order of performing the process of step S3001, or alternatively, the processes of both may be performed simultaneously.

The first relationship generation unit 340 receives the classification result of an area of change and the position information of the area of change from the first change detection unit 120. Furthermore, the first relationship generation unit 340 acquires flow line data from the flow line data generation unit 320. Then, the first relationship generation unit 340 generates product-and-person relationship information corresponding to the area of change on the basis of the imaging time of the area of change tied to the position information of the area of change and of the imaging time tied to the flow line data (step S3004). Specifically, the first relationship generation unit 340 associates the area of change with a person who visited the product shelf at the time closest to the imaging time of the area of change from the flow line data generated at the time before the imaging time when the area of change was detected. Then, the first relationship generation unit 340 supplies the generated product-and-person relationship information to the relationship integration unit 150.

Thereafter, the image processing device 300 performs the processes of steps S3005 to S3006, which are the same processes as steps S1010 to S1011 illustrated in FIG. 11.

As described above, the image processing device 300 of this exemplary embodiment includes the third acquisition unit 310 and the flow line data generation unit 320. With this configuration, the flow line data generation unit 320 generates flow line data on the basis of the RGB image supplied from the third acquisition unit 310. Furthermore, on the basis of the area of change detected from the RGB image of the product shelf 3, the classification result of classifying the area of change, and the flow line data generated from the RGB image of the store aisle, the image processing device 300 generates product-and-person relationship information. The whole body of a person is imaged in the captured image of the store aisle, which is imaged by the imaging device 5 and used to generate the flow line data. Therefore, it is easier to identify the person in the captured image than the RGB image of the product shelf 3. In other words, if the relationship information is generated by using the flow line data as in the image processing device 300, relationship information can be expected to be generated with higher accuracy than in the case where the relationship information is generated by using the person information 134. Therefore, the image processing device 300 according to this exemplary embodiment is able to integrate relationship information with higher accuracy than the image processing device 100 of the first exemplary embodiment. Thus, the flow line data of customers can be acquired more accurately, thereby enabling products purchased by customers to be managed properly.

Figure 22:
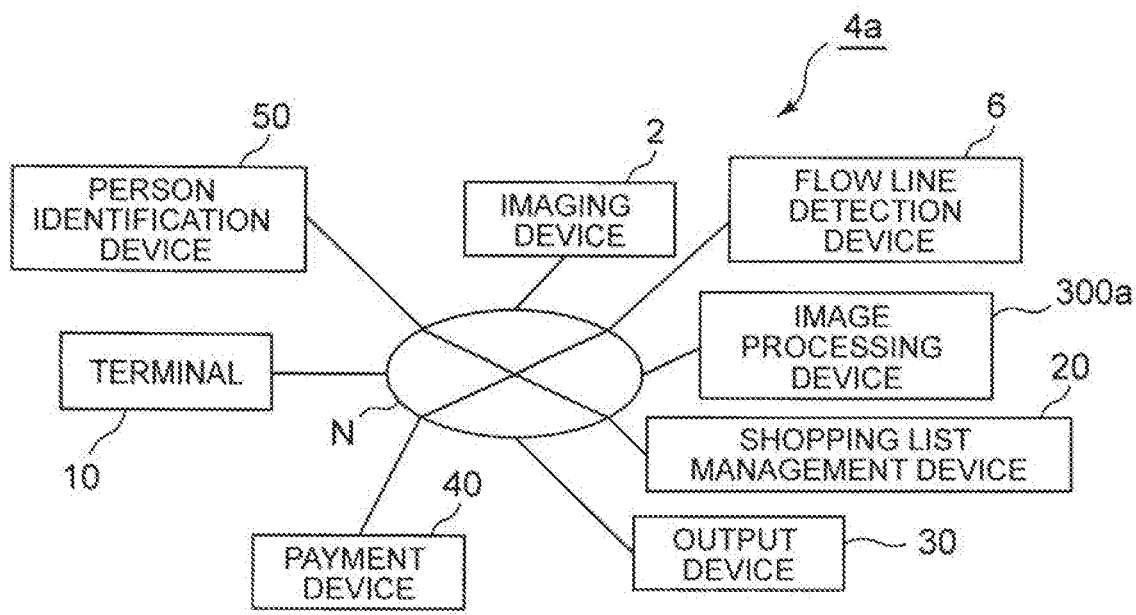

Subsequently, a modification of the third exemplary embodiment will be described. In the third exemplary embodiment, the imaging device 5 images the aisle in the store to generate the flow line data of the customer. The method of generating the flow line data, however, is not limited to the method with an image. FIG. 22 is a block diagram illustrating the modification of the self-checkout system according to the third exemplary embodiment. The self-checkout system 4a illustrated in FIG. 22 includes a flow line detection device 6 that detects the flow line of a customer, instead of the imaging device 5 included in the self-checkout system 4 of the third exemplary embodiment. The self-checkout system 4a illustrated in FIG. 22 includes an image processing device 300a, instead of the image processing device 300 included in the self-checkout system 4 of the third exemplary embodiment.

The flow line detection device 6 is a device that detects the position of a terminal 10 carried by the customer. The flow line detection device 6 detects, for example, a near field radio transmission from the terminal 10 to detect the position of the customer. For example, if the person identification device 50 authenticates the terminal 10 at a predetermined location (for example, an entrance, or the like) in the store, the flow line detection device 6 follows the authenticated person and detects the flow line of the person. The shopping list generation unit 21 may generate a shopping list that corresponds to the person who carries the authenticated terminal 10 at the timing of this authentication.

Figures 23, 24:
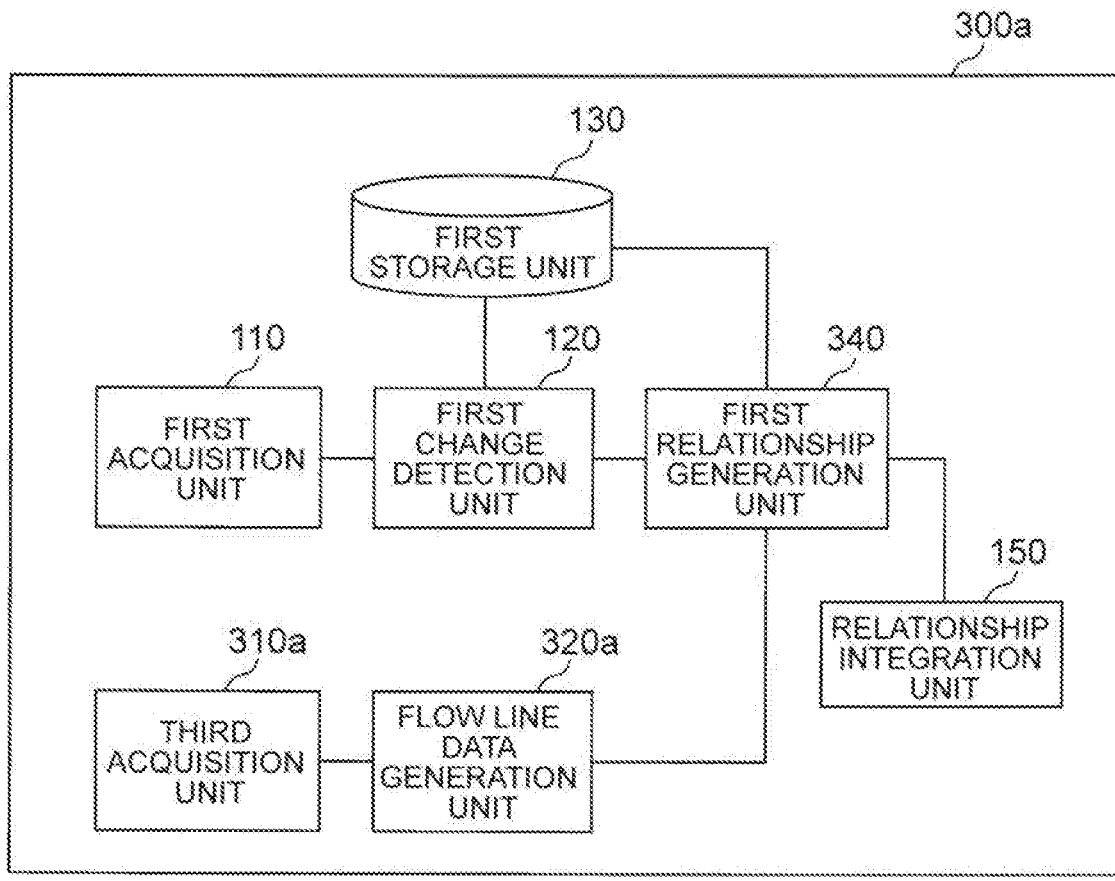

FIG. 23 is a block diagram illustrating a configuration example of the image processing device 300a. As illustrated in FIG. 23, the image processing device 300a of this exemplary embodiment includes a first acquisition unit 110, a first change detection unit 120, a first storage unit 130, a third acquisition unit 310a, a flow line data generation unit 320a, a first relationship generation unit 340, and a relationship integration unit 150. As described above, the image processing device 300a of this modification includes a third acquisition unit 310a and a flow line data generation unit 320a, instead of the third acquisition unit 310 and the flow line data generation unit 320 of the image processing device 300.

The third acquisition unit 310a acquires the position information of the customer from the flow line detection device 6. The position information of the customer includes, for example, the identification information of the terminal 10. The flow line data generation unit 320a generates the flow line data of a person in the store. The flow line data generated by the flow line data generation unit 320a is information including, for example, the identification information of the terminal 10 carried by the customer and the product shelf ID which is the identifier of the product shelf 3 visited by the customer. The method in which the flow line data generation unit 320a generates the flow line data is not particularly limited. Similarly to the third exemplary embodiment, the flow line data generation unit 320a determines that the customer has visited the product shelf 3 by using criteria such that the customer stays in front of the product shelf 3 for a certain period of time, that a distance between the customer and the product shelf 3 is equal to or less than a predetermined distance, or the like. Then, the flow line data generation unit 320a generates flow line data by linking the identification information of the terminal 10 carried by the customer with the product shelf ID of the product shelf visited by the customer.

FIG. 24 is an explanatory diagram illustrating another example of flow line data. As illustrated in FIG. 24, the flow line data generation unit 320a generates flow line data with the identification information of the terminal 10 linked with the product shelf ID. Further, the flow line data generation unit 320a associates the generated flow line data with the acquisition time of the flow line data and supplies them to the first relationship generation unit 340. In other words, the flow line data generation unit 320a supplies the first relationship generation unit 340 with the time when each person in the flow line data visited each product shelf included in the flow line data. The subsequent processes are the same as those of the third exemplary embodiment.

As described above, in this modification, flow line data is generated on the basis of the position information of a person detected by the flow line detection device 6. Thus, the flow line data of customers can be acquired more accurately in the same manner as in the third exemplary embodiment, thereby enabling products purchased by customers to be managed properly.

The self-checkout system of the third exemplary embodiment may be configured to include the second acquisition unit 210 as described in the second exemplary embodiment to classify the change in the product shelf by using an RGB image and a range image.

<Modification of Foreground Area Detection Unit>

Subsequently, description will be made on a modification of the processing of the foreground area detection unit included in the first change detection unit 120 or in the second change detection unit 220 in the image processing device of each exemplary embodiment described above.

In this modification, the foreground area detection unit 121 included in the first change detection unit 120 or in the second change detection unit 220 further uses pre-registered shelf area information to specify that the physical objects included in the area of change are those other than products on the product shelf 3.

In this modification, description will be made on a modification of the foreground area detection unit 121 of the image processing device 100 in the first exemplary embodiment. This modification, however, is applicable to both of the image processing device 200 and the image processing device 300.

Figure 25:
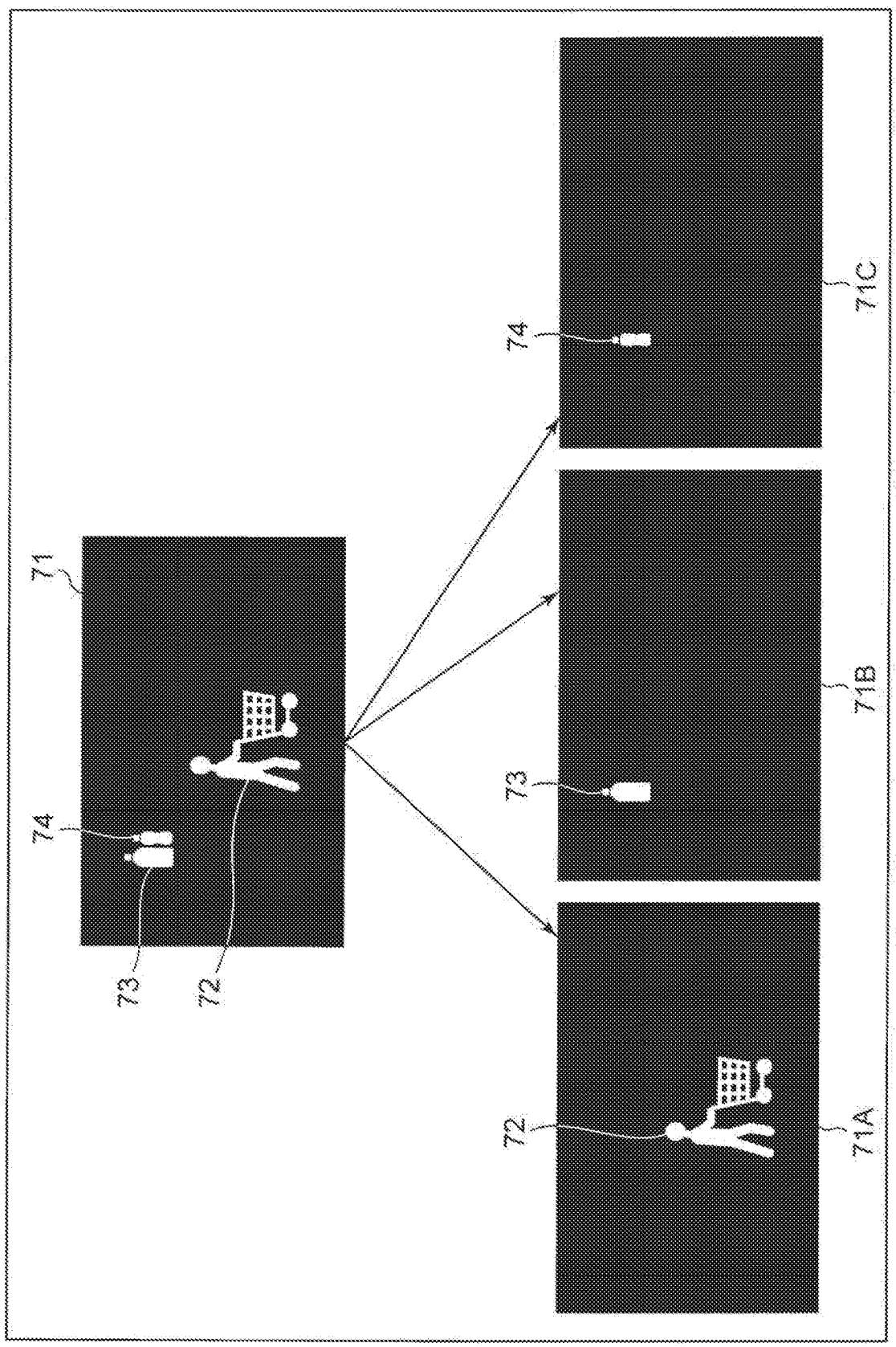
FIG. 25 It depicts an explanatory diagram illustrating an example of operation of detecting a foreground area.
Figure 26:
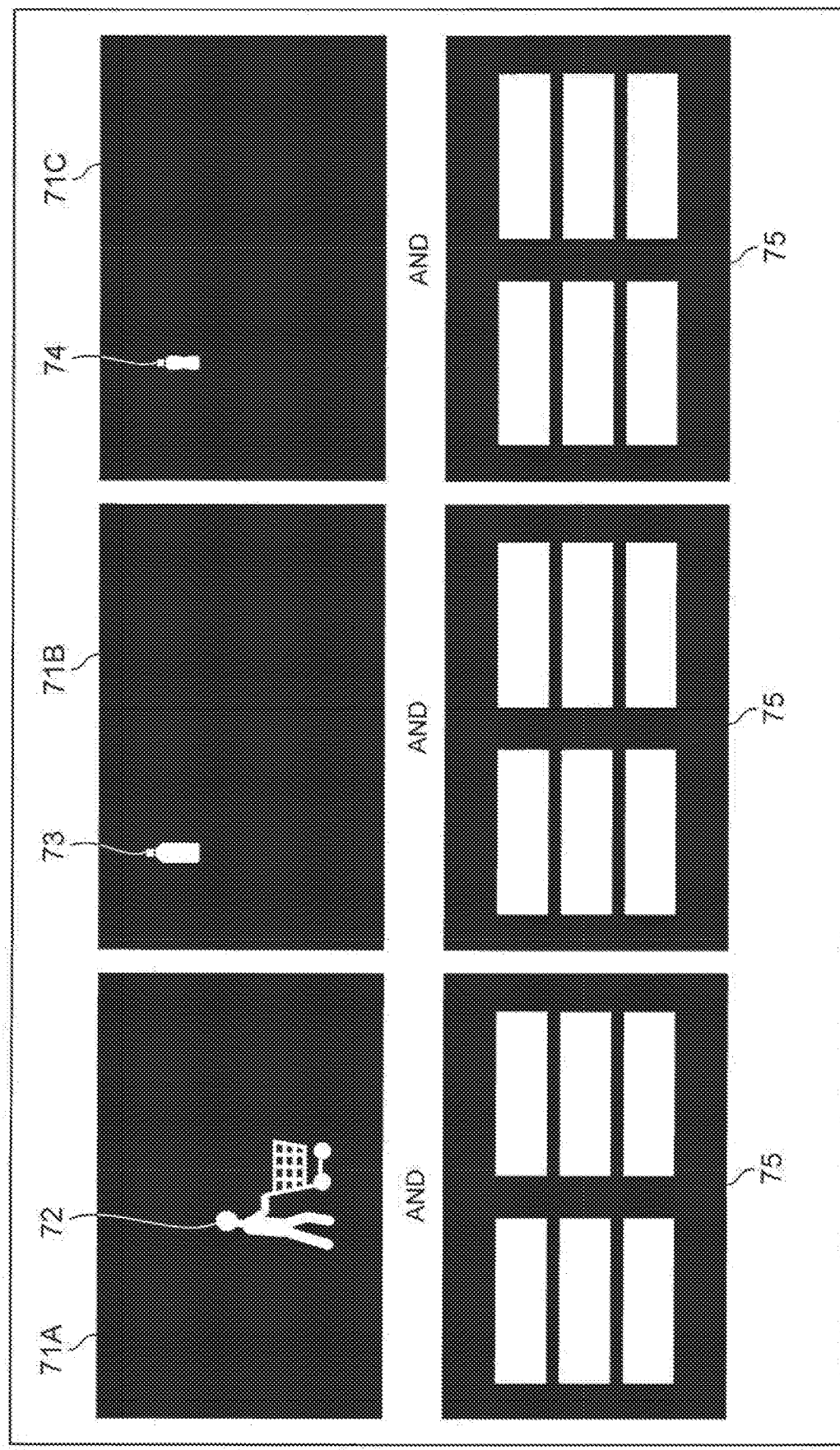
FIG. 26 It depicts an explanatory diagram illustrating an example of operation of detecting a foreground area.
Figure 27:
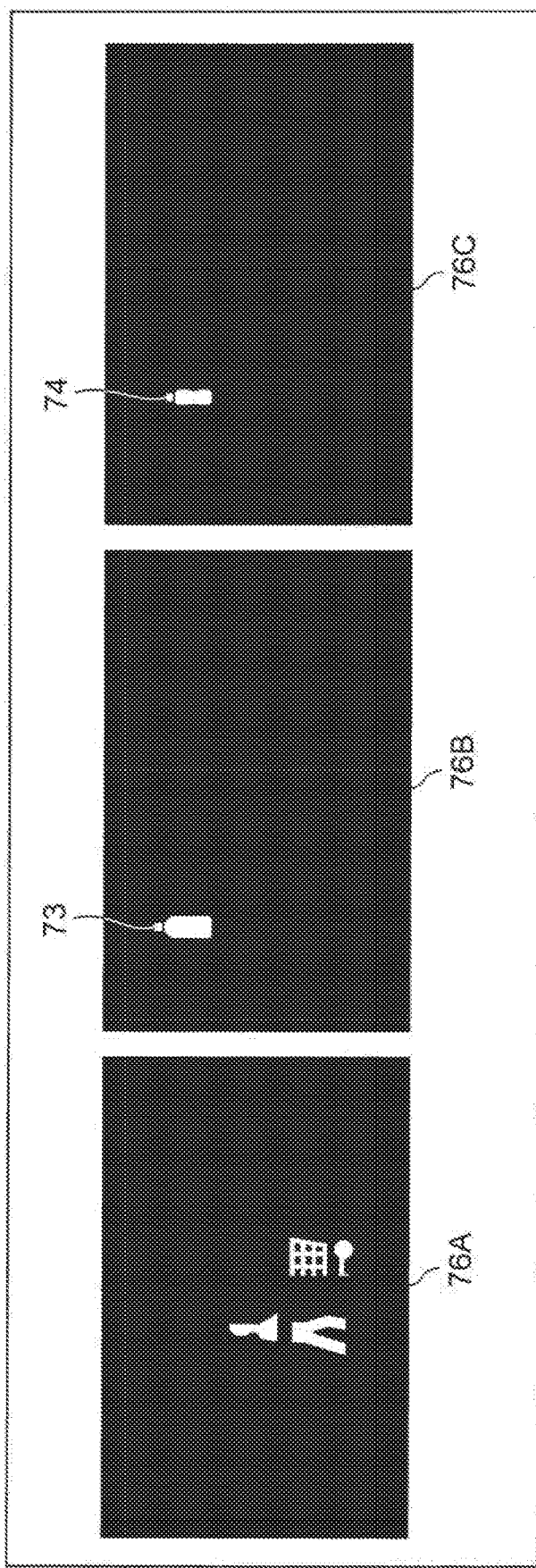
FIG. 27 It depicts an explanatory diagram illustrating an example of operation of detecting a foreground area.

FIGS. 25, 26, and 27 are explanatory diagrams each illustrating an example of operation in which the foreground area detection unit 121 in this modification detects the foreground area.

It is supposed that the foreground area detection unit 121, for example, detects the area of change by comparing the captured image supplied from the first acquisition unit 110 with the background information 131 and generates a detection result 71, which is a binary image indicating the area of change illustrated in FIG. 25. It is assumed that this detection result includes three areas of change, namely, an area of change 72, an area of change 73, and an area of change 74. In such a case, the foreground area detection unit 121 generates a detection result 71A, a detection result 71B, and a detection result 71C, which are separate binary images for the respective areas of change, by a general labeling method with respect to the detection result 71.

In other words, in the case where the detection result includes a plurality of areas of change, the foreground area detection unit 121 generates a plurality of binary images in which each area of change is included in each separate binary image.

Then, the foreground area detection unit 121 determines whether the area of change is the area in which the change related to the change of a product is detected, on the basis of the pre-registered shelf area information and each of the plurality of binary images, where the shelf area information indicates the area in which the product on the product shelf 3 is displayed.

The self-checkout system 1 is monitoring products on the product shelf 3. Therefore, the area where the products are displayed, which is indicated by the shelf area information, can be referred to as "monitored area." Moreover, the shelf area information can also be referred to as "monitored area information." The shelf area information is, for example, an image having the same size as the captured image acquired by the first acquisition unit 110, and may be a binary image with the pixel value of 255 for the monitored area of the product shelf 3 to be monitored and with the pixel value of 0 for others. Furthermore, the number of monitored areas included in the shelf area information may be, for example, one or more. The shelf area information may be stored, for example, in the first storage unit 130 in advance. The shelf area information includes information that specifies the product shelf 3 included in the captured image acquired by the first acquisition unit 110.

The foreground area detection unit 121 performs an AND operation for each corresponding pixel by using the shelf area information related to the product shelf 3 included in the captured image acquired by the first acquisition unit 110. For example, in the case of using the shelf area information 75 illustrated in FIG. 26, the foreground area detection unit 121 performs an AND operation for each corresponding pixel with the detection result 71A, the detection result 71B, or the detection result 71C. In the example illustrated in FIG. 26, a monitored area in the shelf area information 75 is expressed in white, and therefore the shelf area information 75 includes six monitored areas.

A calculation result 76A illustrated in FIG. 27 is a result of the AND operation between the shelf area information 75 and the detection result 71A. Moreover, a calculation result 76B is a result of the AND operation between the shelf area information 75 and the detection result 71B. Furthermore, a calculation result 76C is a result of the AND operation between the shelf area information 75 and the detection result 71C.

Objects other than products such as persons or carts span the areas of a plurality of shelves. Therefore, as a result of the AND operation between the detection result 71A and the shelf area information 75, the part with the pixel value of 255 (white part) that represents an area of change is divided into a plurality of areas, as in the calculation result 76A illustrated on the left side of FIG. 27. On the other hand, the parts (white parts) that represent the areas of change in the calculation result 76B and the calculation result 76C are the same as those in the detection result 71B and the detection result 71C, respectively, and each of the parts is a continuous area (a set of pixels with a pixel value of 255 and with any of the pixels adjacent to those pixels having a pixel value of 255).

The products displayed in the display area (monitored area) of the product shelf 3 do not span the plurality of monitored areas. Therefore, if the area of change is divided into a plurality of areas as in the calculation result 76A, the foreground area detection unit 121 determines that the change in this area of change is a change of an object other than a product. In such a case, the foreground area detection unit 121 does not add this change on the detection result supplied to the foreground area tracking unit 123. In other words, the foreground area detection unit 121 supplies the detection result 71B and the detection result 71C to the foreground area tracking unit 123.

With this configuration, the foreground area tracking unit 123 is able to supply the changes in the products displayed on the product shelf 3 to the first extraction unit 124 and to the second extraction unit 125. In other words, the area change classification unit 126 is able to perform the classifying process of changes in the products displayed on the product shelf 3, thereby preventing a reduction in the accuracy of classifying the changes in the products, which may be caused by an influence of an object other than the products. Moreover, the foreground area detection unit 121 is able to classify the change in the area of change as a change in an object other than the product before the classification process is performed by the area change classification unit 126, thereby enabling a reduction in the amount of throughput of the area change classification unit 126.

Subsequently, a concrete example of the present invention will be described. In a first concrete example, there is described an example of operation of the self-checkout system in the case where a customer carries the terminal 10. In the second concrete example, there is described an example of operation of the self-checkout system in the case where a customer does not carry the terminal 10.

Figure 28:
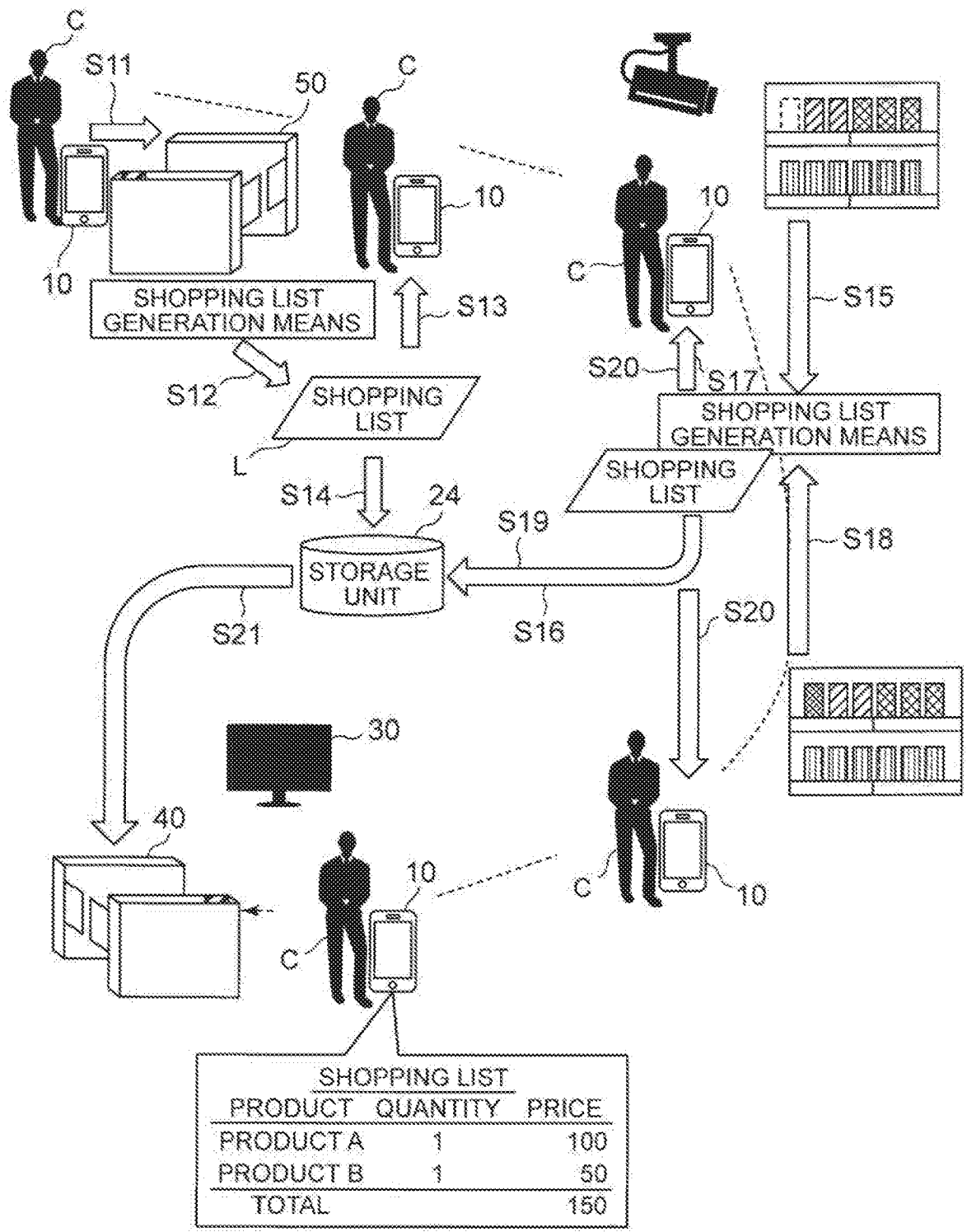
FIG. 28 It depicts an explanatory diagram illustrating an example of operation of a self-checkout system in a first concrete example.

FIG. 28 is an explanatory diagram illustrating an example of operation of the self-checkout system in the first concrete example. First, when a customer C visits the store, the person identification device 50 identifies the person via the terminal 10 carried by the customer (step S11). Thereafter, the person is uniquely managed with the identification ID that identifies the terminal 10. Further, a shopping list generation means (the shopping list generation unit 21 in the exemplary embodiment) generates a shopping list L corresponding to the identification ID (step S12). A notification unit 23 sends the generated shopping list L to the terminal 10 (step S13). Furthermore, the notification unit 23 stores the generated shopping list L in the shopping list storage unit 24 (step S14).

Thereafter, a change detection means (the first change detection unit 120 in the exemplary embodiment) detects the area of change on the basis of the captured image of the product, and a classification means (the area change classification unit 126 in the exemplary embodiment) classifies the change in the product shelf in the detected area of change (step S15). It is assumed here that the customer picked up the product. A shopping list generation means (the shopping list updating unit 22 in the exemplary embodiment) specifies the product on the basis of the classification of the change in the product shelf (specifically, "a change caused by a product having been taken") and of the shelving information on the product shelf and performs a registration process for registering the specified product on the shopping list L corresponding to the person (step S16). The notification unit 23 notifies the terminal 10 of the contents of the shopping list L on which the product has been registered (step S17).

Furthermore, the change detection means detects the area of change on the basis of the captured image of the product, and the classification means classifies the change in the product shelf in the detected area of change (step S18). It is assumed here that the customer returned the product. The shopping list generation means specifies the product on the basis of the classification of the change in the product shelf (specifically, "a change caused by that a product is contained anew in the product shelf 3") and of the shelving information on the product shelf and performs a deletion process for deleting the specified product from the shopping list L corresponding to the person (step S19). The notification unit 23 notifies the terminal 10 of the contents of the shopping list L from which the product has been deleted (step S20). The notification unit 23 may notify the terminal 10 of the shopping list L with the delete flag set for the product.

When the customer is to leave the store, the payment device 40 performs a payment process on the basis of the contents of the shopping list L corresponding to the person (step S21). At this time, the output device 30 may display the contents of the shopping list L.

Figure 29:
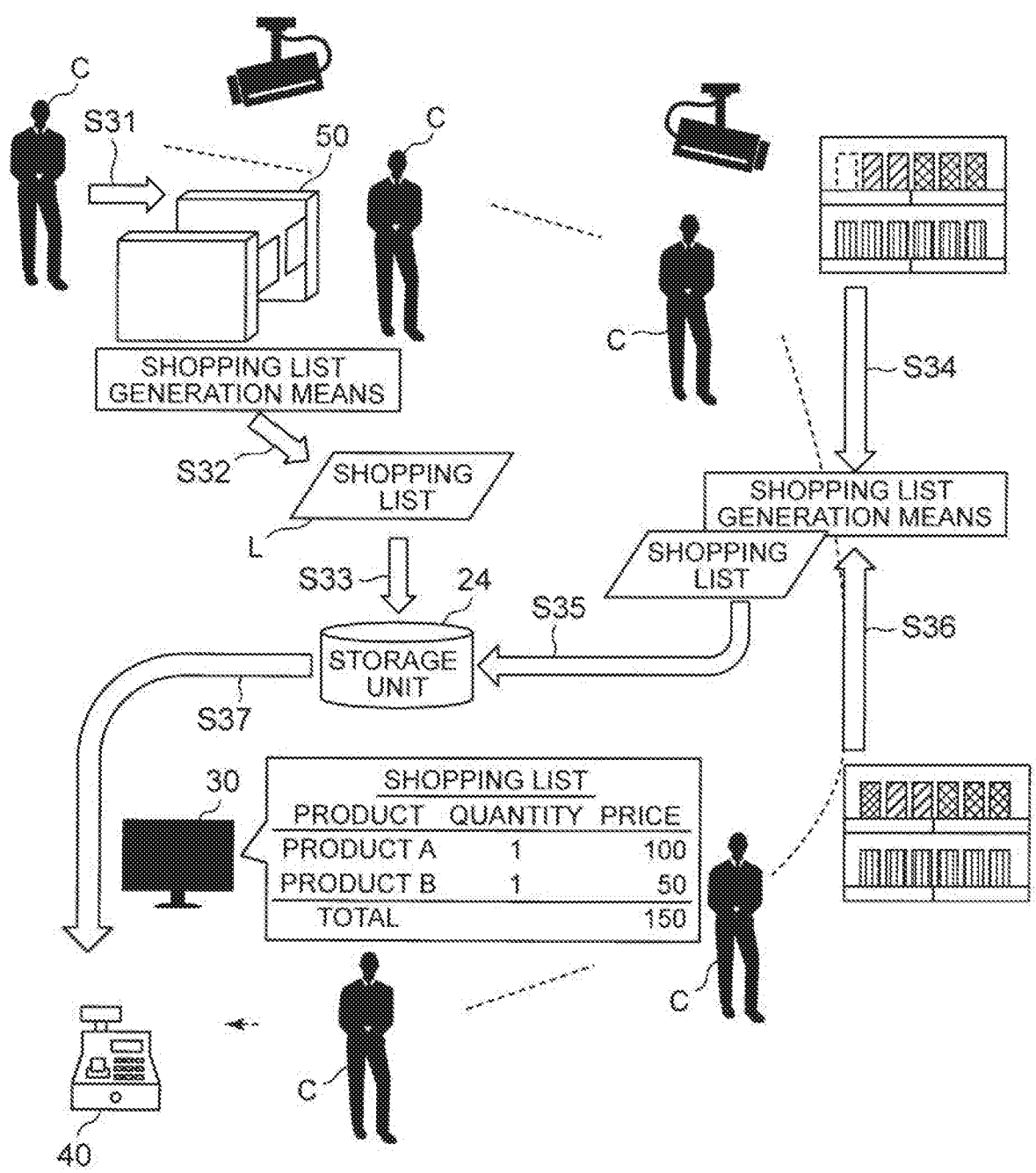
FIG. 29 It depicts an explanatory diagram illustrating an example of operation of a self-checkout system in a second concrete example.

FIG. 29 is an explanatory diagram illustrating an example of operation of a self-checkout system in the second concrete example. First, when a customer visits the store, the person identification device 50 identifies a person C from an image captured by the imaging device 2 (step S31). Thereafter, the person is uniquely identified with the identification ID that identifies the person. Further, the shopping list generation means (the shopping list generation unit 21 in the exemplary embodiment) generates the shopping list L corresponding to the identification ID (step S32). Moreover, the notification unit 23 stores the generated shopping list L in the shopping list storage unit 24 (step S33).

Thereafter, in the same manner as the first concrete example, the change detection means (the first change detection unit 120 in the exemplary embodiment) detects the area of change on the basis of the captured image of the product, and the classification means (the area change classification unit 126 in the exemplary embodiment) classifies the change in the product shelf in the detected area of change (step S34). It is assumed here that the customer picked up the product. The shopping list generation means (the shopping list updating unit 22 in the exemplary embodiment) specifies the product on the basis of the classification of the change in the product shelf (specifically, "a change caused by a product having been taken") and of the shelving information on the product shelf and performs a registration process for registering the specified product on the shopping list that corresponds to the person (step S35). Specifically, the shopping list generation means adds the product to the shopping list L stored in the shopping list storage unit 24.

It is assumed that the customer thereafter returned the product. Similarly to the first concrete example, the shopping list generation means specifies the product on the basis of the classification of the change in the product shelf (specifically, "a change caused by a product having been arranged on the product shelf") and of the shelving information on the product shelf and performs a deletion process for deleting the specified product from the shopping list L corresponding to the person (step S36). Specifically, the shopping list generation means deletes the product from the shopping list L stored in the shopping list storage unit 24.

When the customer is to leave the store, the payment device 40 performs a payment process on the basis of the contents of the shopping list L corresponding to the person C (step S37). Specifically, the output device 30 displays the contents of the shopping list and the total amount, and the payment device 40 performs a payment process based on a deposit or a card payment from the person.

<About Hardware Configuration>

Figure 30:
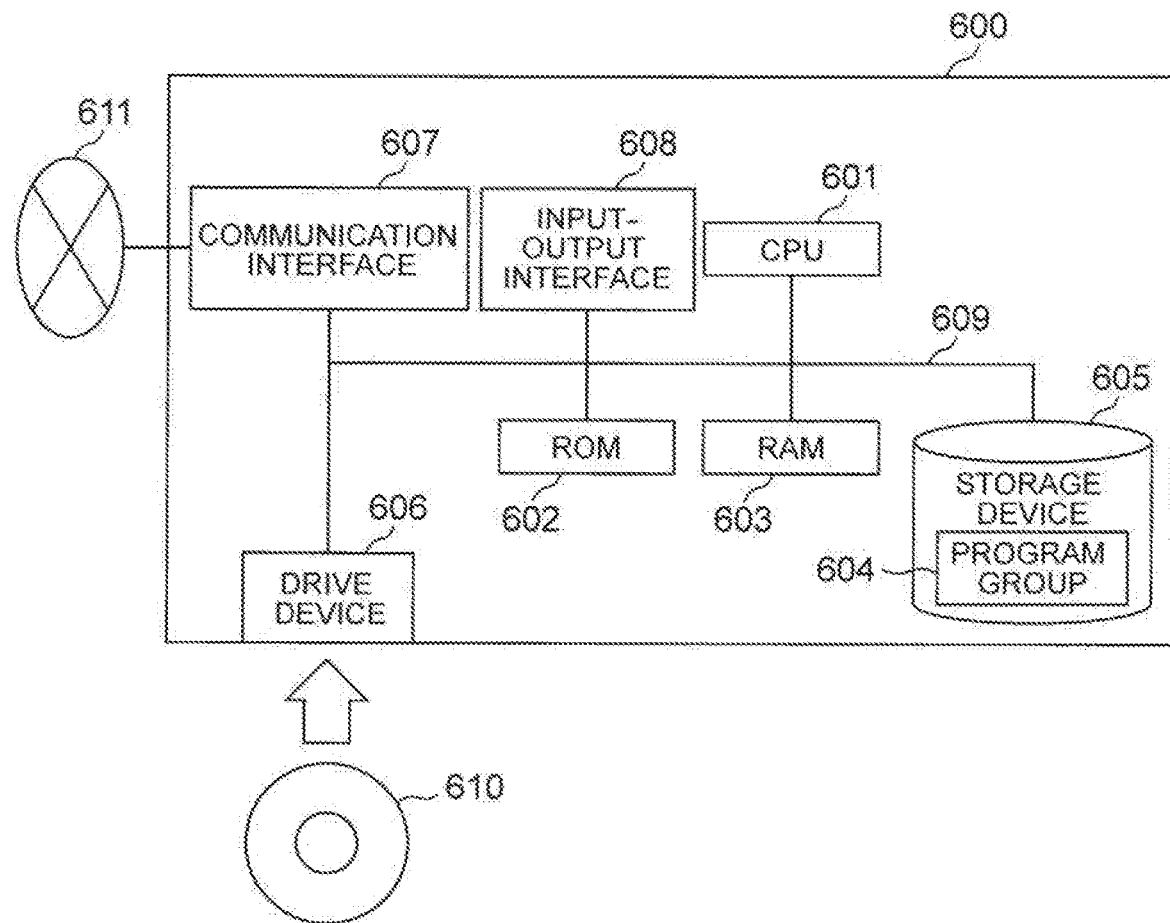
FIG. 30 It depicts a block diagram illustrating a hardware configuration example of an information processing device for implementing constituent elements of each device.

In each of the exemplary embodiments described above, the constituent elements of each device (more specifically, each of the image processing devices 100 to 500 and the shopping list management device 20) are blocks of, for example, functional units. Some or all of the constituent elements of each device are implemented by an arbitrary combination of the information processing device 600 and a program illustrated in FIG. 30. FIG. 30 illustrates a block diagram representing a hardware configuration example of the information processing device 600 that implements the constituent elements of each device. The information processing device 600 includes, for example, the following components.

Central processing unit (CPU) 601
Read only memory (ROM) 602
Random access memory (RAM) 603
Program group 604 loaded in RAM 603
Storage device 605 that stores program group 604
Drive device 606 that reads and writes data on recording medium 610 outside information processing device 600
Communication interface 607 connected to communication network 611 outside information processing device 600
Input-output interface 608 that inputs and outputs data
Bus 609 that connects components The constituent elements of each device in each of the above exemplary embodiments are implemented by the CPU 601 acquiring and executing the program group 604 that implements these functions. The program group 604 that implements the functions of the constituent elements of each device is stored in advance in the storage device 605 or the ROM 602, for example, and the CPU 601 loads the program group 604 in the RAM 603 and executes it, as necessary. The program group 604 may be supplied to the CPU 601 via the communication network 611 or, alternatively, may be stored in the recoding medium 610 in advance, and the drive device 606 may read the program and supply it to the CPU 601.

There are various modifications for the methods of implementing each device. Each device may be implemented by an arbitrary combination of the information processing device 600 and a program, which are separate for each constituent element. Moreover, a plurality of constituent elements included in each device may be implemented by an arbitrary combination of one information processing device 600 and a program.

Further, some or all of the constituent elements of each image processing device can be implemented by other general-purpose or dedicated circuits, processors, or the like or a combination thereof. These may be configured by a single chip, or may be configured by a plurality of chips connected via a bus.

Some or all of the constituent elements of each device may be implemented by a combination of the above-described circuits or the like and a program.

In the case where some or all of the constituent elements of each device are implemented by a plurality of information processing devices, circuits, or the like, the plurality of information processing devices, circuits, or the like may be centrally arranged or distributed. For example, the information processing devices, circuits, and the like may be implemented in a form such as a client and server system, a cloud computing system, or the like, in which the information processing devices, circuits, and the like are connected to each other via a communication network.

Figure 31:
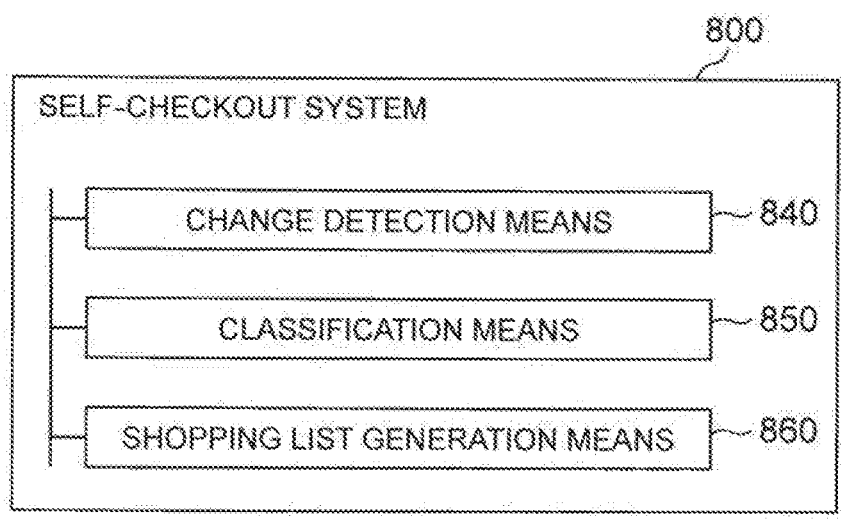
FIG. 31 It depicts a block diagram illustrating the outline of a self-checkout system according to the present invention.

Subsequently, an outline of the present invention will be described. FIG. 31 is a block diagram illustrating the outline of a self-checkout system according to the present invention. A self-checkout system 800 (for example, the self-checkout system 1) according to the present invention includes: a change detection means 810 (for example, the first change detection unit 120) for detecting an area of change in a product shelf on which a product has been arranged, on the basis of a captured image of the product; a classification means 850 (for example, the area change classification unit 126) for classifying the change in the product shelf in the detected area of change; and a shopping list generation means 860 (for example, the shopping list updating unit 22) for generating a shopping list for a customer, on the basis of the classification of the change in the product shelf and of shelving information on the product shelf.

With such a configuration, products purchased by customers can be properly managed without preparing images of individual products in advance.

Specifically, the classification of the change in the product shelf may be any one of a change caused by a product having been taken, a change in a store environment of the product shelf, a change caused by a product having been arranged on the product shelf, and a change caused by a different appearance of the product.

In addition, in the case where the classification of the change in the product shelf is a change caused by a product having been taken, the shopping list generation means 860 may register the product on the shopping list.

Furthermore, in the case where the classification of the change in the product shelf is a change caused by a product having been arranged on the product shelf, the shopping list generation means 860 may delete the product from the shopping list.

Moreover, the change caused by a different appearance of the product, which is the classification of the change in the product shelf, may include a change in appearance caused by a different product having been arranged and a change in appearance caused by a change in product attitude.

Further, the self-checkout system 800 may include a relationship generation means (for example, the first relationship generation unit 140) for generating relationship information indicating the relationship between the area of change and the person. The relationship generation means may generate the relationship information by associating the area of change with the person, on the basis of the imaging time and the person information acquired from the captured image and on the basis of the position information and the imaging time of the area of change acquired from the captured image. Then, the shopping list generation means 860 may generate a shopping list corresponding to the person, on the basis of the classification of the change in the product shelf in the area of change and of the shelving information on the product shelf With this configuration, the flow line of the person can be acquired from the image, by which products purchased by customers can be properly managed.

Similarly, the self-checkout system 800 may include a relationship generation means (for example, the second relationship generation unit 240) for generating relationship information indicating a relationship between the area of change and the person. The relationship generation means may generate relationship information by associating the area of change with the person, on the basis of the information acquisition time and position information of the person detected by a flow line detection means (for example, the flow line detection device 6) for detecting a flow line of a person in a store and on the basis of the position information and imaging time of the area of change acquired from the captured image. In addition, the shopping list generation means may generate a shopping list corresponding to the person on the basis of the classification of the change in the product shelf in the area of change and of the shelving information on the product shelf Since the flow line of a person can also be acquired with the above configuration, products purchased by customers can be properly managed.

In addition, specifically, the classification means 850 may use a shelf change model (for example, the shelf change model 132), which is a model of a change in the product shelf depending on before and after a time change, to classify the change in the product shelf from the images of the area of change.

The change detection means 840 may detect the area of change in the product shelf on which the product has been arranged on the basis of an RGB image and of a range image, which has been obtained by imaging the imaging range of the RGB image, as the captured images of the product. This configuration enables changes in the product shelf to be determined more accurately, by which products purchased by customers can be managed more properly.

Although some or all of the above exemplary embodiments may also be described as in the following Supplementary notes, the present invention is not limited to the following.

(Supplementary note 1) A self-checkout system comprising: a change detection means for detecting an area of change in a product shelf on which a product has been arranged, on the basis of a captured image of the product; a classification means for classifying the change in the product shelf in the detected area of change; and a shopping list generation means for generating a shopping list for a customer on the basis of the classification of the change in the product shelf and of shelving information on the product shelf.

(Supplementary note 2) The self-checkout system according to Supplementary note 1, wherein the classification of the change in the product shelf is one of a change caused by a product having been taken, a change in a store environment of the product shelf, a change caused by a product having been arranged on the product shelf, and a change caused by a different appearance of the product.

(Supplementary note 3) The self-checkout system according to Supplementary note 2, wherein the shopping list generation means registers the product on the shopping list in the case where the classification of the change in the product shelf is a change caused by a product having been taken.

(Supplementary note 4) The self-checkout system according to Supplementary note 2, wherein the shopping list generation means deletes the product from the shopping list in the case where the classification of the change in the product shelf is a change caused by a product having been arranged on the product shelf.

(Supplementary note 5) The self-checkout system according to any one of Supplementary notes 2 to 4, wherein the change caused by a different appearance of the product, which is the classification of the change in the product shelf, includes a change in appearance caused by a different product having been arranged and a change in appearance caused by a change in product attitude.

(Supplementary note 6) The self-checkout system according to any one of Supplementary notes 1 to 5, further comprising a relationship generation means for generating relationship information indicating a relationship between an area of change and a person, wherein: the relationship generation means generates relationship information by associating the area of change with the person, on the basis of the imaging time and person information acquired from the captured image and on the basis of the position information and the imaging time of the area of change acquired from the captured image; and the shopping list generation means generates the shopping list corresponding to the person on the basis of the classification of the change in the product shelf in the area of change and of the shelving information on the product shelf.

(Supplementary note 7) The self-checkout system according to any one of Supplementary notes 1 to 5, further comprising a relationship generation means for generating relationship information indicating a relationship between an area of change and a person, wherein: the relationship generation means generates relationship information by associating the area of change with the person, on the basis of the information acquisition time and position information of the person detected by a flow line detection means for detecting a flow line of a person in a store and on the basis of the position information and imaging time of the area of change acquired from the captured image; and the shopping list generation means generates a shopping list corresponding to the person on the basis of the classification of the change in the product shelf in the area of change and of the shelving information on the product shelf.

(Supplementary note 8) The self-checkout system according to any one of Supplementary notes 1 to 7, wherein the classification means classifies the change in the product shelf from the image of the area of change by using a shelf change model that is a model of a change in the product shelf depending on before and after a time change.

(Supplementary note 9) The self-checkout system according to any one of Supplementary notes 1 to 8, wherein the change detection means detects the area of change in the product shelf on which the product has been arranged on the basis of an RGB image and of a range image obtained by imaging the imaging range of the RGB image as the captured images of the product.

(Supplementary note 10) A purchased product management method comprising the steps of: detecting an area of change in a product shelf on which a product has been arranged, on the basis of a captured image of the product; classifying the change in the product shelf in the detected area of change; and generating a shopping list for a customer on the basis of the classification of the change in the product shelf and of shelving information on the product shelf.

(Supplementary note 11) A purchased product management program for causing a computer to perform: a change detection process for detecting an area of change in a product shelf on which a product has been arranged, on the basis of a captured image of the product; a classification process for classifying the change in the product shelf in the detected area of change; and a shopping list generation process for generating a shopping list for a customer on the basis of the classification of the change in the product shelf and of shelving information on the product shelf.

The programs described in each of the above exemplary embodiments and supplementary notes are each stored in a storage device or recorded in a computer-readable recoding medium. The recoding medium is a portable medium such as, for example, a flexible disk, an optical disk, a magneto-optical disk, and a semiconductor memory.

REFERENCE SIGNS LIST 1, 4, 4a Self-checkout system
2, 5 Imaging device
3 Product shelf
6 Flow line detection device
10 Terminal
20 Shopping list management device
30 Output device
40 Payment device
50 Person identification device
71 Detection result
72 Area of change
73 Area of change
74 Area of change
75 Shelf area information
76 Calculation result
90 Classification result
91 Second attention image
92 First attention image
93 Type of change
100 Image processing device
110 First acquisition unit
120 First change detection unit
121 Foreground area detection unit
122 Background information updating unit
123 Foreground area tracking unit
124 First extraction unit
125 Second extraction unit
126 Area change classification unit
127 Distance information updating unit
130 First storage unit
131 Background information
132 Shelf change model
133 Foreground information
134 Person information
135 Distance information
140 First relationship generation unit
150 Relationship integration unit
200 Image processing device
210 Second acquisition unit
220 Second change detection unit
230 Second storage unit
240 Second relationship generation unit
250 Relationship integration unit
300, 300a Image processing device
310, 310a Third acquisition unit
320, 320a Flow line data generation unit 340 First relationship generation unit
600 Information processing device
601 CPU
602 ROM
603 RAM
604 Program group
605 Storage device
606 Drive device
607 Communication interface
608 Input-output interface
609 Bus
610 Recoding medium
611 Communication network

The invention claimed is:

1. A self-checkout system comprising a hardware processor configured to execute a software code to:
   detect an area of change in a product shelf on which a product has been arranged, based on a captured image of the product;
   classify the change in the product shelf from the image of the area of change by using a shelf change model that is a model of a change in the product shelf depending on before and after a time change; and
   generate a shopping list for a customer based on the classification of the change in the product shelf and shelving information on the product shelf.

2. The self-checkout system according to claim 1, wherein the classification of the change in the product shelf is one of a change caused by a product having been taken, a change in a store environment of the product shelf, a change caused by a product having been arranged on the product shelf, and a change caused by a different appearance of the product.

3. The self-checkout system according to claim 2, wherein the hardware processor is configured to execute the software code to register the product on the shopping list in a case where the classification of the change in the product shelf is a change caused by a product having been taken.

4. The self-checkout system according to claim 2, wherein the hardware processor is configured to execute the software code to delete the product from the shopping list in a case where the classification of the change in the product shelf is a change caused by a product having been arranged on the product shelf.

5. The self-checkout system according to claim 2, wherein the change caused by a different appearance of the product, which is the classification of the change in the product shelf, includes a change in appearance caused by a different product having been arranged and a change in appearance caused by a change in product attitude.

6. The self-checkout system according to claim 1, wherein the hardware processor is configured to execute the software code to:
   generate relationship information indicating a relationship between an area of change and a person by associating the area of change with the person, based on the imaging time and person information acquired from the captured image and based on the position information and the imaging time of the area of change acquired from the captured image; and
   generate the shopping list corresponding to the person based on the classification of the change in the product shelf in the area of change and of the shelving information on the product shelf.

7. The self-checkout system according to claim 1, wherein the hardware processor is configured to execute the software code to:
   generate relationship information indicating a relationship between an area of change and a person by associating the area of change with the person, based on the information acquisition time and position information of the person detected by a flow line detection unit for detecting a flow line of a person in a store and based on the position information and imaging time of the area of change acquired from the captured image; and
   generate a shopping list corresponding to the person based on the classification of the change in the product shelf in the area of change and of the shelving information on the product shelf.

8. The self-checkout system according to claim 1, wherein the hardware processor is configured to execute the software code to detect the area of change in the product shelf on which the product has been arranged based on an RGB image and a range image obtained by imaging the imaging range of the RGB image as the captured images of the product.

9. A purchased product management method comprising:
   detecting an area of change in a product shelf on which a product has been arranged, based on a captured image of the product;
   classifying the change in the product shelf from the image of the area of change by using a shelf change model that is a model of a change in the product shelf depending on before and after a time change; and
   generating a shopping list for a customer based on the classification of the change in the product shelf and shelving information on the product shelf.

10. A non-transitory computer readable information recording medium storing a purchased product management program, when executed by a processor, that performs a method for:
   detecting an area of change in a product shelf on which a product has been arranged, based on a captured image of the product;
   classifying the change in the product shelf from the image of the area of change by using a shelf change model that is a model of a change in the product shelf depending on before and after a time change; and
   generating a shopping list for a customer based on the classification of the change in the product shelf and shelving information on the product shelf.

* * * * *